(12) United States Patent
Kurata

(10) Patent No.: US 9,223,074 B2
(45) Date of Patent: Dec. 29, 2015

(54) LIGHT GUIDE PLATE AND AREA LIGHT SOURCE DEVICE

(71) Applicant: OMRON Corporation, Kyoto (JP)

(72) Inventor: Gouo Kurata, Saitama (JP)

(73) Assignee: OMRON Corporation, Kyoto (JP)

( * ) Notice: Subject to any disclaimer, the term of this patent is extended or adjusted under 35 U.S.C. 154(b) by 220 days.

(21) Appl. No.: 13/762,554

(22) Filed: Feb. 8, 2013

(65) Prior Publication Data

US 2014/0132887 A1    May 15, 2014

(30) Foreign Application Priority Data

Nov. 15, 2012    (JP) .................................. 2012-251396

(51) Int. Cl.
*F21V 8/00*    (2006.01)

(52) U.S. Cl.
CPC .............. *G02B 6/0018* (2013.01); *G02B 6/002* (2013.01); *G02B 6/003* (2013.01); *G02B 6/0016* (2013.01); *G02B 6/0038* (2013.01)

(58) Field of Classification Search
CPC ...................................................... G02B 6/0018
USPC .............................. 349/65; 362/611, 608, 619
See application file for complete search history.

(56) References Cited

U.S. PATENT DOCUMENTS

| | | | |
|---|---|---|---|
| 2010/0195019 A1* | 8/2010 | Shinohara et al. | 349/62 |
| 2010/0315833 A1* | 12/2010 | Holman et al. | 362/607 |
| 2011/0170036 A1* | 7/2011 | Ishikawa et al. | 349/65 |
| 2011/0176089 A1* | 7/2011 | Ishikawa | G02B 6/0018 349/65 |
| 2011/0205759 A1* | 8/2011 | Kurata | G02B 6/002 362/611 |
| 2011/0286237 A1* | 11/2011 | Tanoue et al. | 362/606 |
| 2012/0182500 A1* | 7/2012 | Lee | G02B 6/0068 349/65 |

FOREIGN PATENT DOCUMENTS

| | | |
|---|---|---|
| JP | 2011-146185 A | 7/2011 |
| JP | 2012-059419 A | 3/2012 |
| JP | 2012-138222 A | 7/2012 |
| KR | 2011-0042183 A | 4/2011 |
| KR | 2011-0083490 A | 7/2011 |
| WO | 2008/153024 A1 | 12/2008 |
| WO | 2010/070821 A1 | 6/2010 |

OTHER PUBLICATIONS

Office Action in corresponding Japanese Patent Application No. 2012-251396 dated Dec. 17, 2013, with translation (5 pages).

(Continued)

*Primary Examiner* — Sang V Nguyen
(74) *Attorney, Agent, or Firm* — Osha Liang LLP

(57) ABSTRACT

A light guide plate has an end surface configured to have light incident thereon, a light introduction part that confines light incident through the end surface, and a light guide plate body disposed to be continuously joined to the light introduction part. The light guide plate body has a thickness smaller than a maximum thickness of the light introduction part. The light guide plate body outputs the incident light to an outside from a lighting region through a light exit part. The light introduction part includes an inclined surface in at least one of a light-exit-side surface and an opposite surface of the light-exit-side surface. The directivity change pattern changes directivity of the light passing to the lighting region from the light introduction part.

19 Claims, 27 Drawing Sheets

(56) References Cited

OTHER PUBLICATIONS

Espacenet Publication Abstract for JP2011-146185, publication date Jul. 28, 2011 (2 pages).

Espacenet Publication Abstract for JP2012-138222, publication date Jul. 19, 2012 (2 pages).

Korean Office Action for Application No. 10-2013-0014240, mailed on Jan. 20, 2014 (10 pages).

* cited by examiner

LIGHT GUIDE PLATE AND AREA LIGHT SOURCE DEVICE

CROSS-REFERENCE TO RELATED APPLICATION

The present application claims priority from Japanese Patent Application No. 2012-251396, filed on Nov. 15, 2012, the subject matter of which is hereby incorporated by reference.

BACKGROUND

1. Technical Field

The present invention relates to a light guide plate and an area light source device. Specifically, the present invention relates to an area light source device that is used as a backlight for a liquid crystal display device and a light guide plate constituting the area light source device.

2. Related Art

Nowadays, there is increasing a demand for a low profile of an area light source device with the progress of a low-profile mobile device provided with the area light source device. In order to thin the area light source device, it is necessary to thin a light guide plate. However, even if the flat light guide plate can be thinned, there is a limitation to a reduction of a height of a light source including an LED. Therefore, in the case that the thin, flat light guide plate is used, the height of the light source is larger than a thickness of an end surface (a light incident surface) of the light guide plate, the light source disposed opposite the light incident surface of the light guide plate is projected from an upper surface of the light guide plate. When the light source is projected from the light guide plate, whole light emitted from the light source is not incident to the light incident surface of the light guide plate, but the light leaks partially to the outside to degrade light use efficiency.

Use of a light guide plate, in which a light introduction part larger than a thickness of a flat light guide plate body is provided at an end of the light guide plate body and an inclined surface inclined from a maximum thickness point of the light introduction part toward the end of the light guide plate body is provided in the light introduction part, has been proposed. For example, PCT International Publication No. WO2010/070821 and PCT International Publication No. WO2008-153024 disclose the area light source devices in each of which the light guide plate is used.

FIG. 1 illustrates an example of an area light source device 11 in which the light guide plate including the light introduction part thicker than the light guide plate body is used. A light guide plate 13 includes a light guide plate body 14 having a substantially even thickness and a wedge-shaped light introduction part 15. A deflection pattern or a diffusion pattern is formed in a rear surface of the light guide plate body 14, and a lenticular lens 16 is formed on a surface. An inclined surface 17 is formed in the light introduction part 15. The inclined surface 17 is inclined from a point having the maximum thickness of the light introduction part 15 toward an end of the light guide plate body 14. The thickness of an end surface (a light incident surface) of the light introduction part 15 is larger than a height of the light source 12. In the area light source device 11 in which the light guide plate 13 is used, the thickness of the end surface of the light introduction part 15 is larger than the height of the light source 12, whereby the light introduction part 15 efficiently takes in the light emitted from the light source 12. The light taken in by the light introduction part 15 is guided to the light guide plate body 14 and spread in a flat manner, and the light is reflected by the deflection pattern or the diffusion pattern, and output to the outside from a light exit surface of the light guide plate body 14. At this point, a directional pattern of the light output from the light exit surface is spread by the lenticular lens 16. Therefore, in the area light source device having the above structure, not only the light use efficiency of the light source can be improved but also the low profile of the area light source device can be achieved.

However, for the area light source device 11 in which the inclined surface 17 is provided in the light introduction part 15 as illustrated in FIG. 1, the light traveling in a direction oblique to an optical axis of the light source 12 in the light introduction part 15 is reflected by the inclined surface 17 and spread in a horizontal direction (a width direction of the light guide plate) by an arrow in FIG. 1, and an angle formed between the light and the optical axis of the light source 12 increases when the light guide plate body 14 is viewed from above. As a result, the light horizontally spread by the inclined surface 17 leaks from a side surface of the light guide plate 13, or the light is horizontally incident to the lenticular lens 16 and leaks from the lenticular lens 16, whereby the degradation of the light use efficiency or the degradation of luminance evenness is generated by a light quantity loss.

FIG. 2 is a perspective view of the area light source device disclosed in PCT International Publication No. WO2010/070821. In an area light source device 21 in FIG. 2, plural V-groove light leakage prevention patterns 22 parallel to one another are provided in the inclined surface 17 of the light introduction part 15. The light leakage prevention pattern 22 reduces the light leakage from the inclined surface 17 to improve the light use efficiency. At the same time, the light reflected by the light Leakage prevention pattern 22 is easily diffused in the horizontal direction compared with the case that only the inclined surface 17 is provided without providing the light leakage prevention pattern 22. Therefore, the horizontal spread of the light increases, and the light leaks further easily from the side surface of the light guide plate 13. Additionally, in the case that optical patterns, such as the lenticular lens, are provided in the upper surface or the lower surface of the Light guide plate 13, the light leaks easily from the optical pattern. As a result, the degradation of the light use efficiency or the degradation of the luminance evenness is also generated by the light quantity loss.

SUMMARY

FIG. 3 shows an area light source device 30 (see Japanese Patent Application No. 2012-59419). The area light source device 30 includes a light source 32 and a light guide plate 33. In the light guide plate 33, a wedge-shaped light introduction part 35 is continuously and integrally molded at one end of a plate-like light guide plate body 34. An inclined surface 37 is provided on an upper surface of the light introduction part 35. The inclined surface 37 is downwardly inclined toward the end of the light guide plate body 34 from a surface of portion thicker than that of the light guide plate body 34 of the light introduction part 35. A region from a position slightly distant from an end edge on the side of the light introduction part of the light guide plate body 34 to the other end of the light guide plate body 34 constitutes a lighting region 46 that outputs the light, and a lenticular lens 36 is formed on the upper surface of the lighting region 46. In a region (a pattern forming region 47) located between the light introduction part 35 and the lighting region 46 in the light guide plate body 34, a directivity change pattern 40 is provided in order to change a directivity direction of the light passing from the light introduction part 35 to the lighting region 46 such that an angle formed with a direction perpendicular to a light incident surface 38 becomes small when viewed from above a light exit surface 39.

In the area light source device 30, the light emitted from the light source 32 is incident to the light introduction part 35 through the light incident surface 38, the light incident to the light introduction part 35 is confined in the light introduction part 35, and the light is introduced to the light guide plate body 34 while reflected between the inclined surface 37 and a lower surface of the light introduction part 35. The light, which is introduced to the light guide plate body 34 and guided in the light guide plate body 34, is output to the outside from the lighting region 46 by a light output part provided in the lower surface of the light guide plate body 34. The light incident to the light guide plate body 34 through the light introduction part 35 is reflected by striking on the directivity change pattern 40, thereby decreasing the angle with the direction perpendicular to the light incident surface 38 like light L2 in FIG. 3. Therefore, the light hardly leaks to the outside from the side surface of the light guide plate 33, and hardly leaks to the outside from the lenticular lens 36. The light aligned in the direction perpendicular to the light incident surface 38 is spread in a width direction by the lenticular lens 36 when output from the lighting region 46.

However, for the area light source device 30 in FIG. 3, in the case that the directivity change pattern 40 is projected upward from the surface of the lighting region, it is found that the light incident to the light guide plate body 34 leaks to the outside from a lighting-region-side end surface 48 of the directivity change pattern 40 like the numeral L1 in FIG. 4. When the light leaks from the lighting-region-side end surface 48 of the directivity change pattern 40, unfortunately an end portion of the lighting region 46 shines locally (an eyespot luminescence phenomenon), and a luminance distribution of the lighting region 46 becomes uneven. As illustrated in FIG. 5, with increasing leakage of the light from the lighting-region-side end surface 48 of the directivity change pattern 40, an eyespot luminescence K is increased in front of the light source 32, which results in an effective lighting region (a region where the light having even luminance is output without generating the eyespot luminescence and used for lighting in the lighting region 46) being narrowed by the eyespot luminescence K.

One or more embodiments of the present invention decreases the light leaking from the lighting-region-side end surface of the directivity change pattern, thereby homogenizing the luminance distribution of the lighting region and enlarging the effective lighting region.

In accordance with one or more embodiments of the present invention, a light guide plate includes: a light introduction part that confines light incident through an end surface; and a light guide plate body that is provided so as to be continuously joined to the light introduction part, the light guide plate body having a thickness smaller than a maximum thickness of the light introduction part, the light guide plate body outputting the incident light to an outside from a lighting region through a light exit part, wherein the light introduction part includes an inclined surface in at least one of a light-exit-side surface and an opposite surface of the light-exit-side surface, the inclined surface being inclined toward an end of the light guide plate body from a surface of a portion thicker than the light guide plate body, the light guide plate body includes a directivity change pattern in a region located between the light introduction part and the lighting region in at least one of the light-exit-side surface and the opposite surface of the light-exit-side surface, the directivity change pattern changing directivity of the light passing to the lighting region from the light introduction part, and at least part of a local minimum portion of the directivity change pattern is located inside the light guide plate body from a surface of the lighting region. As used herein, for example, the local minimum portion of the directivity change pattern means a valley line of a groove-like directivity change pattern. In the case that a lenticular lens pattern or the like is provided on the surface in the lighting region, the surface of the lighting region means a surface located at a level of a vertex of the pattern.

In a light guide plate according to one or more embodiments of the present invention, at least part of the local minimum portion of the directivity change pattern is located inside the light guide plate body from the surface of the lighting region, so that the area of the lighting-region-side end surface of the directivity change pattern can be reduced compared with the case that the whole directivity change pattern is projected from the surface of the lighting region. As a result, the light leaking from the lighting-region-side end surface of the directivity change pattern is decreased to suppress the eyespot luminescence, and the effective lighting region can be prevented from being narrowed.

In a light guide plate according to one or more embodiments of the present invention, the whole local minimum portion of the directivity change pattern is located inside the light guide plate body from the surface of the lighting region. Accordingly, the light leaking from the lighting-region-side end surface of the directivity change pattern can be decreased, and the effective lighting region can be prevented from being narrowed.

In accordance with one or more embodiments of the present invention, a light guide plate includes: a light introduction part that confines light incident through an end surface; and a light guide plate body that is provided so as to be continuously joined to the light introduction part, the light guide plate body having a thickness smaller than a maximum thickness of the light introduction part, the light guide plate body outputting the incident light to an outside from a lighting region through a light exit part, wherein the light introduction part includes an inclined surface in at least one of a light-exit-side surface and an opposite surface of the light-exit-side surface, the inclined surface being inclined toward an end of the light guide plate body from a surface of a portion thicker than the light guide plate body, the light guide plate body includes a directivity change pattern in a region located between the light introduction part and the lighting region in at least one of the light-exit-side surface and the opposite surface of the light-exit-side surface, the directivity change pattern changing directivity of the light passing to the lighting region from the light introduction part, and at least part of a local maximum portion of the directivity change pattern is located inside the light guide plate body from a surface of the lighting region. As used herein, for example, the local minimum portion of the directivity change pattern means a valley line of a groove-like directivity change pattern. In the case that the lenticular lens pattern or the like is provided on the surface in the lighting region, the surface of the lighting region means the surface located at the level of the vertex of the pattern.

In the light guide plate according to one or more embodiments of the present invention, at least part of the local maximum portion of the directivity change pattern is located inside the light guide plate body from the surface of the lighting region, so that the area of the lighting-region-side end surface of the directivity change pattern can be reduced compared with the case that the whole directivity change pattern is projected from the surface of the lighting region. As a result, the light leaking from the lighting-region-side end surface of the directivity change pattern is decreased to suppress the eyespot luminescence, and the effective lighting region can be prevented from being narrowed.

In a light guide plate according to one or more embodiments of the present invention, the whole local maximum portion of the directivity change pattern is located inside the light guide plate body from the surface of the lighting region. Accordingly, the light leaking from the lighting-region-side end surface of the directivity change pattern can be decreased, and the effective lighting region can be prevented from being narrowed.

In a light guide plate according to one or more embodiments of the present invention, at least part of the local maximum portion of the directivity change pattern is located outside the surface of the lighting region, and in the directivity change pattern, a lighting-region-side end surface of a portion projected outward from the surface of the lighting region has an angle of 45° or less with respect to the surface of the lighting region. Accordingly, the light leaking from the lighting-region-side end surface of the directivity change pattern can be decreased, and the effective lighting region can be prevented from being narrowed.

In accordance with one or more embodiments of the present invention, a light guide plate includes: a light introduction part that confines light incident through an end surface; and a light guide plate body that is provided so as to be continuously joined to the light introduction part, the light guide plate body having a thickness smaller than a maximum thickness of the light introduction part, the light guide plate body outputting the incident light to an outside from a lighting region through a light exit part, wherein the light introduction part includes an inclined surface in at least one of a light-exit-side surface and an opposite surface of the light-exit-side surface, the inclined surface being inclined toward an end of the light guide plate body from a surface of a portion thicker than the light guide plate body, the light guide plate body includes a directivity change pattern in a region located between the light introduction part and the lighting region in at least one of the light-exit-side surface and the opposite surface of the light-exit-side surface, the directivity change pattern changing directivity of the light passing to the lighting region from the light introduction part, and at least part of a local minimum portion of the directivity change pattern is located inside the light guide plate body from a surface of the lighting region, and a light-introduction-part-side end portion of the directivity change pattern is connected to the inclined surface of the light introduction part so as to pierce the inclined surface. As used herein, for example, the local minimum portion of the directivity change pattern means a valley line of a groove-like directivity change pattern. In the case that a lenticular lens pattern or the like is provided on the surface in the lighting region, the surface of the lighting region means a surface located at a level of a vertex of the pattern. "The light-introduction-part-side end portion of the directivity change pattern is connected to the inclined surface of the light introduction part so as to pierce the inclined surface" means that a gap does not exist between the light-introduction-part-side end surface of the directivity change pattern and the inclined surface of the light introduction part or that the light-introduction-part-side end surface of the directivity change pattern does not exist in an outer surface of the light guide plate. Accordingly, the light leakage can be decreased to improve the light use efficiency.

In a light guide plate according to one or more embodiments of the present invention, the directivity change pattern changes the directivity of the light passing to the lighting region from the light introduction part such that an angle formed with a direction perpendicular to the end surface of the light introduction part when viewed from a direction perpendicular to the lighting region becomes small.

In a light guide plate according to one or more embodiments of the present invention, a light diffusion pattern is provided in the light introduction part in order to spread the light incident through the end surface of the light introduction part in a width direction of the light guide plate body. There is no particular limitation to the position where the light diffusion pattern is provided. For example, the light diffusion pattern may be provided in the upper surface and the lower surface of the light introduction part, the upper surface or the lower surface that is of the inclined surface, and the light incident surface. Accordingly, the light that enters the light introduction part from the light incident surface can be changed to the vertical direction by the directivity change pattern after horizontally spread by the light diffusion pattern. The luminance at the edge of the light guide plate is enhanced by sending the light to the neighborhood of the side surface of the light guide plate. At the same time, the direction of the light is aligned in the vertical direction to hardly leak from the side surface of the light guide plate or the optical pattern of the lenticular lens. Therefore, the evenness of the luminance and the improvement of the light use efficiency can be achieved.

In a light guide plate according to one or more embodiments of the present invention, a lenticular lens shape is formed in the lighting region. Accordingly, the light output from the lighting region can be widened in the direction orthogonal to the length direction of the lenticular lens.

In accordance with one or more embodiments of the present invention, an area light source device includes: a light guide plate; and a light source that emits the light to the end surface of the light introduction part in the light guide plate. In the area light source device according to one or more embodiments of the present invention, the light leaking from the lighting-region-side end surface of the directivity change pattern formed in the light guide plate is decreased, so that the effective lighting region can be prevented from being narrowed.

The light guide plate according to one or more embodiments of the present invention and area light source device according to one or more embodiments of the present invention can be applied to the liquid crystal display device. In the light guide plate according to one or more embodiments of the present invention and the area light source device according to one or more embodiments of the present invention, the effective lighting region can be widened without enlarging the area of the light guide plate.

The light guide plate according to one or more embodiments of the present invention and area light source device according to one or more embodiments of the present invention can be applied to a smartphone and mobile devices, such as a tablet computer, an electronic book reader, and an electronic dictionary.

Figure 1:
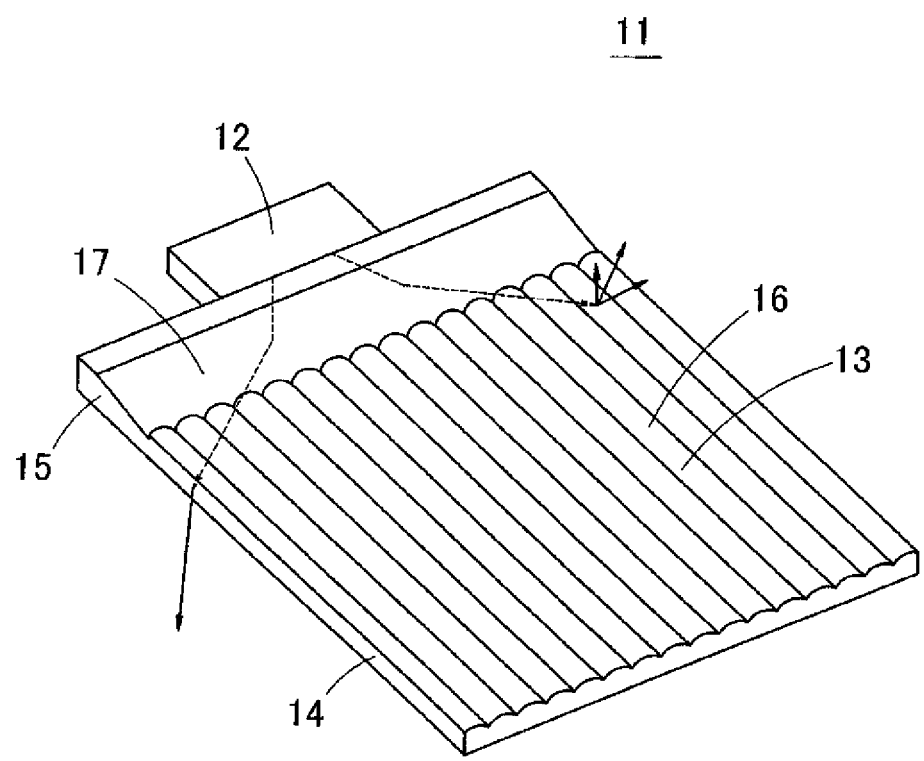
FIG. 1 is a perspective view illustrating a conventional area light source device.
Figure 2:
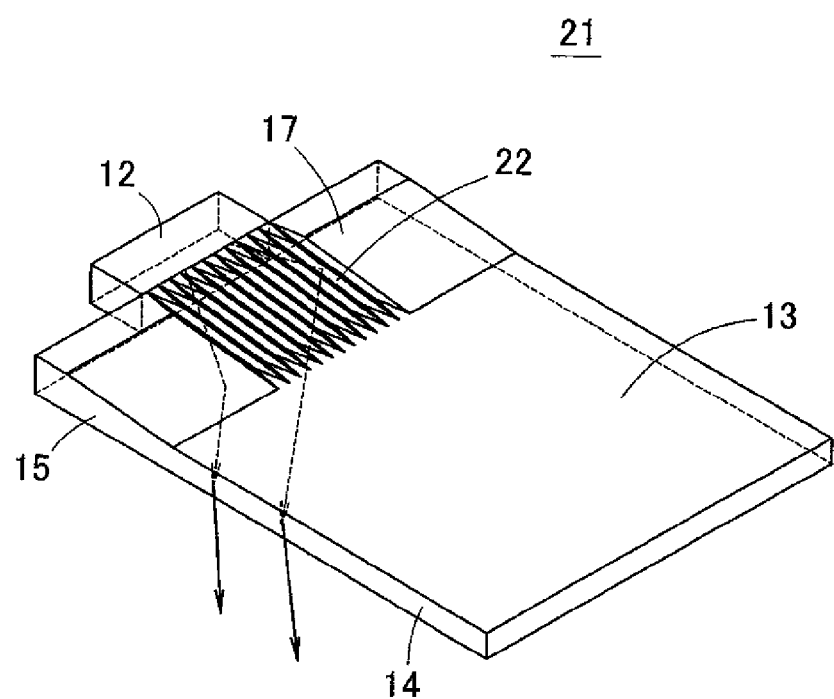
FIG. 2 is a perspective view of an area light source device disclosed in PCT International Publication No. WO2010/070821.
Figure 3:
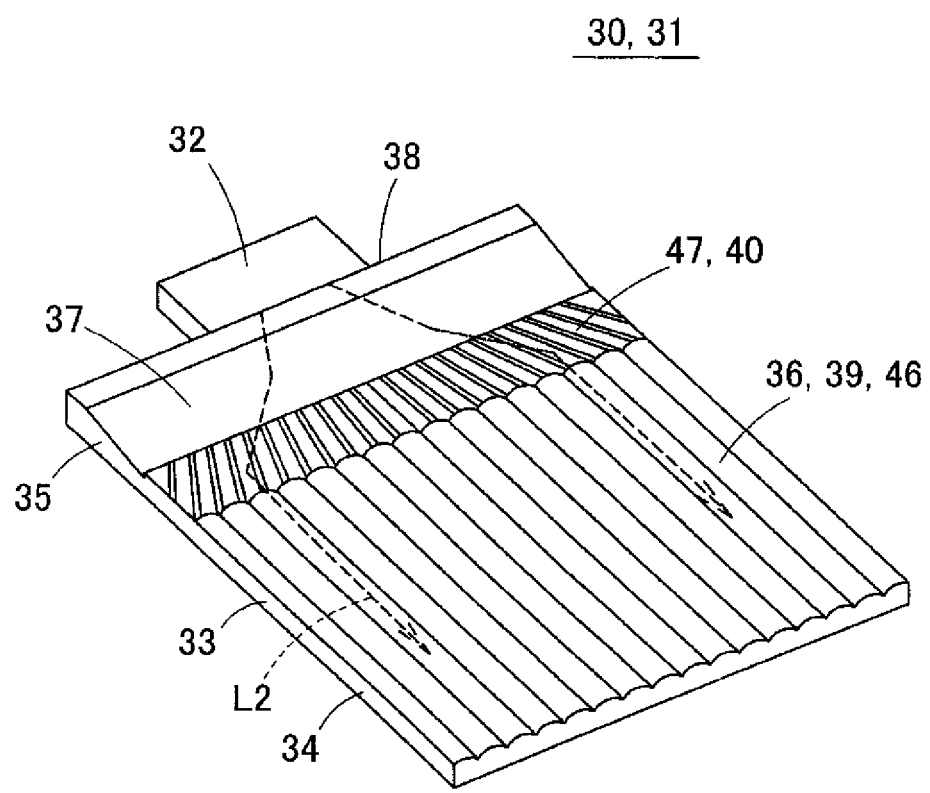
FIG. 3 is a perspective view illustrating an area light source device disclosed in Japanese Patent Application No. 2012-
Figure 4:
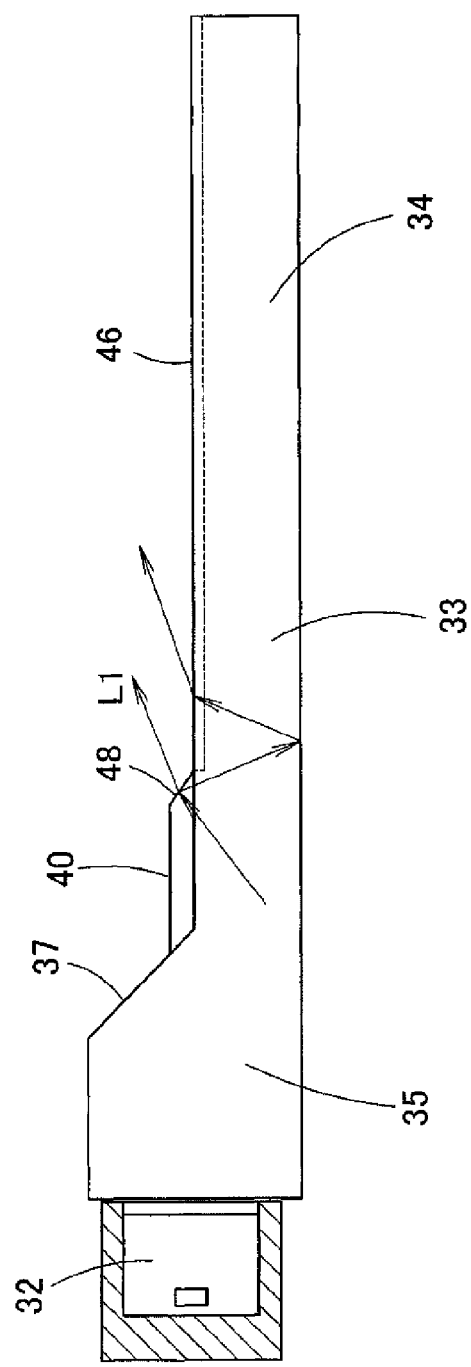

59419 and area light source device according to a first embodiment of the present invention;

FIG. 4 is a schematic sectional view illustrating explaining the area light source device in FIG. 3.

Figure 5:
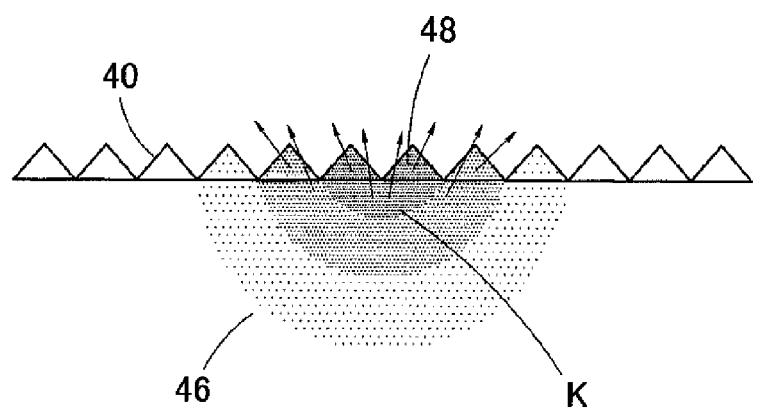
Figure 6:
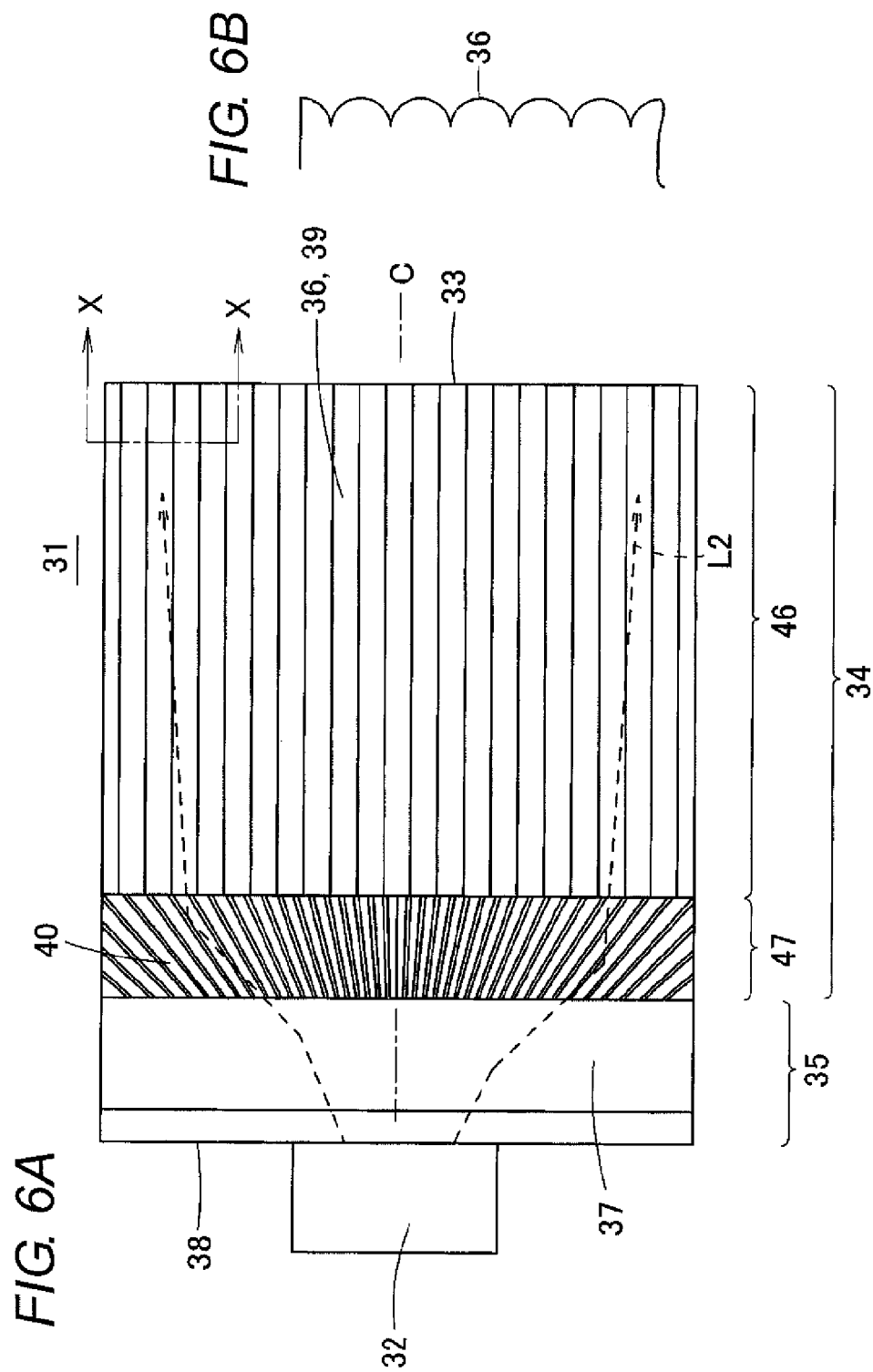
Figure 7:
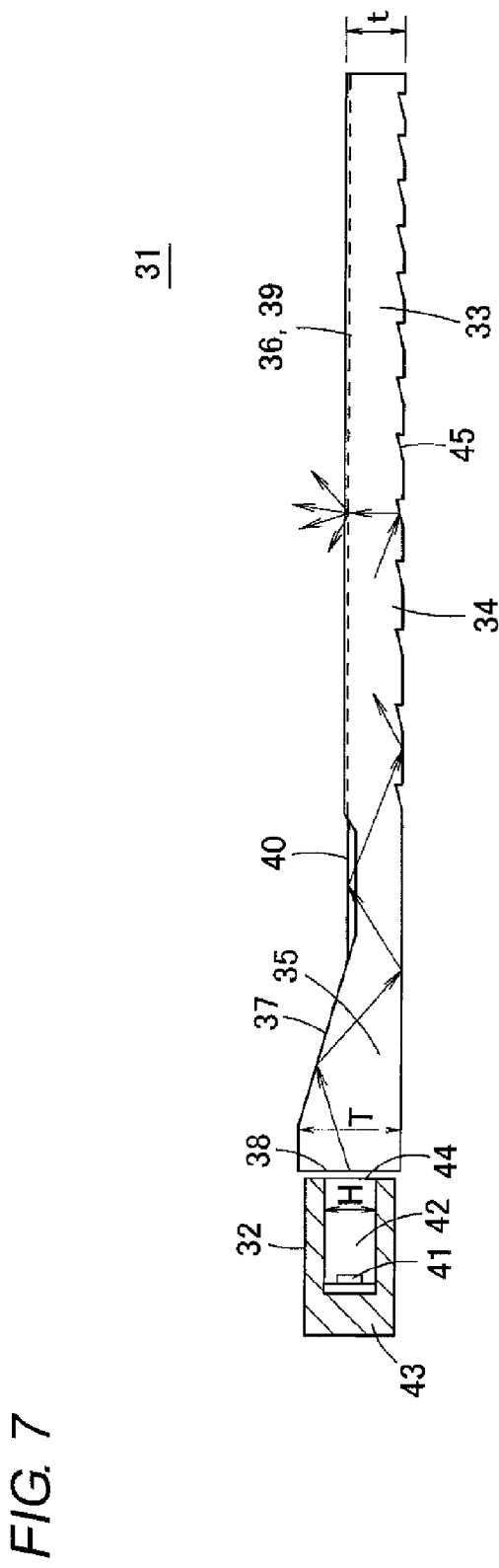
Figure 8:
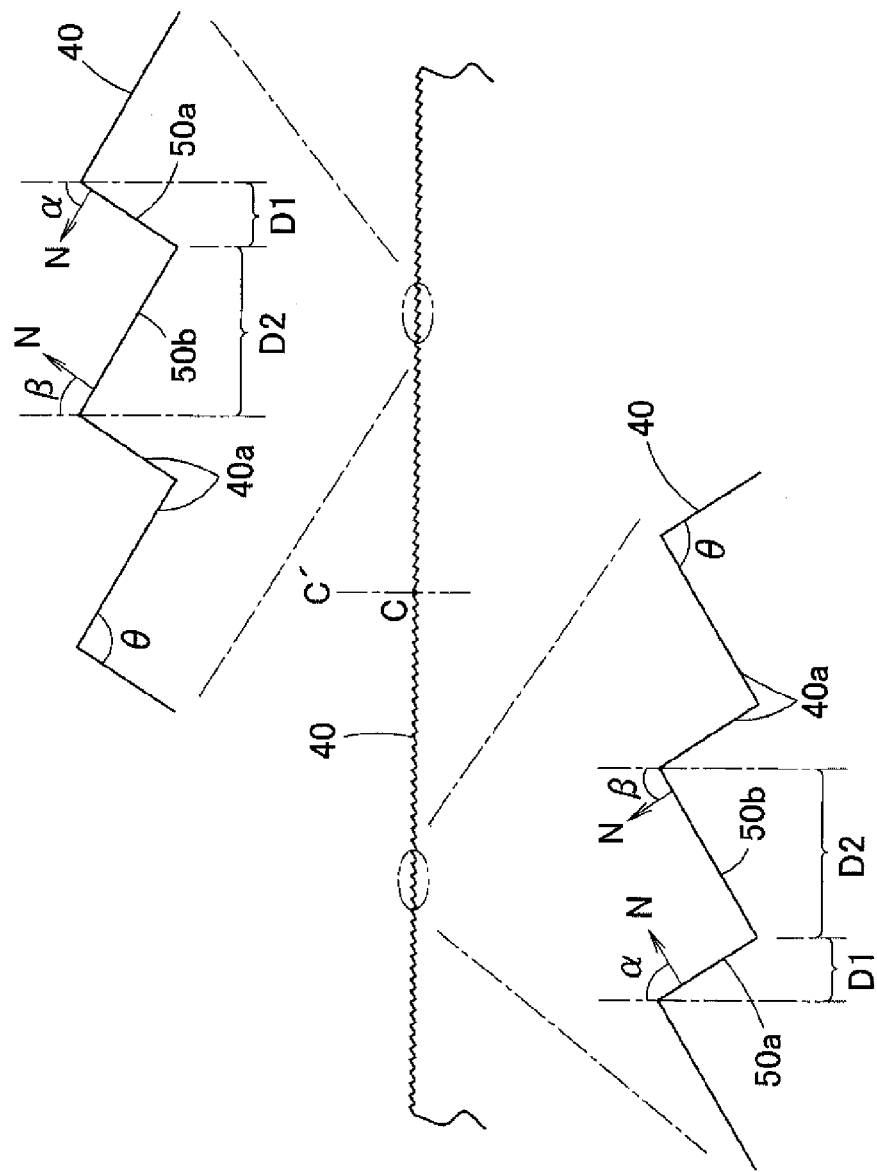
Figure 9:
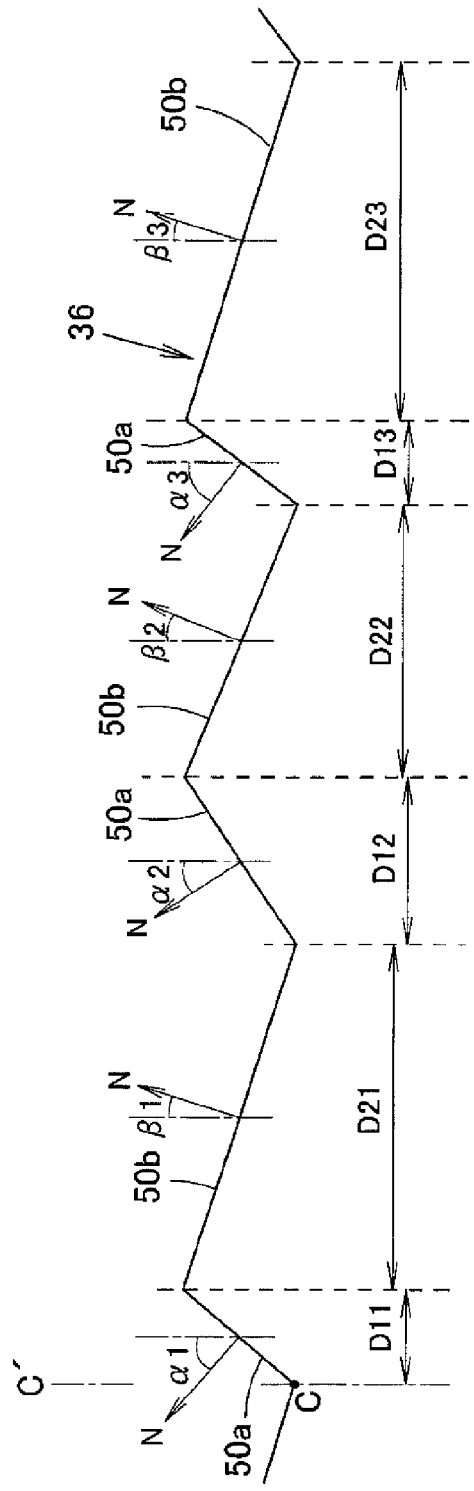
Figure 10A:
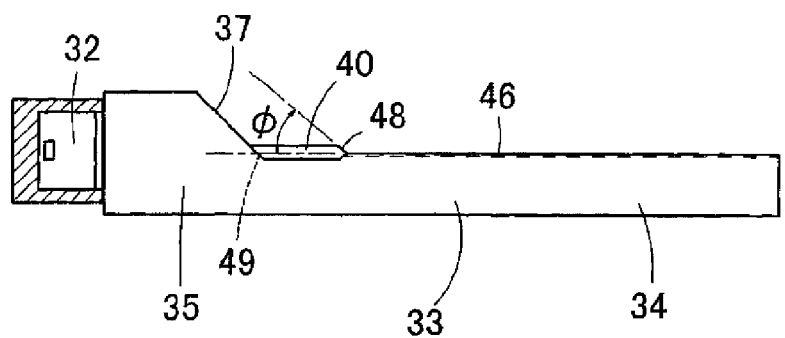
Figure 10B:
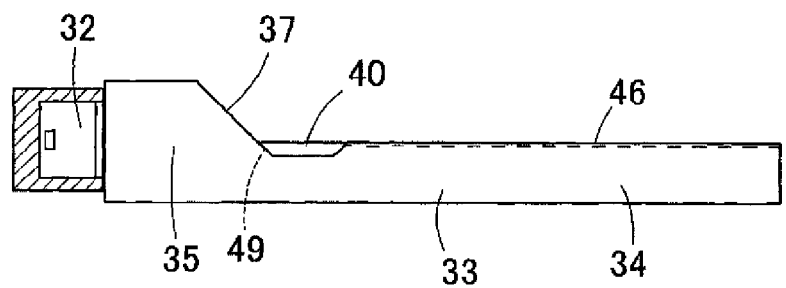
Figure 10C:
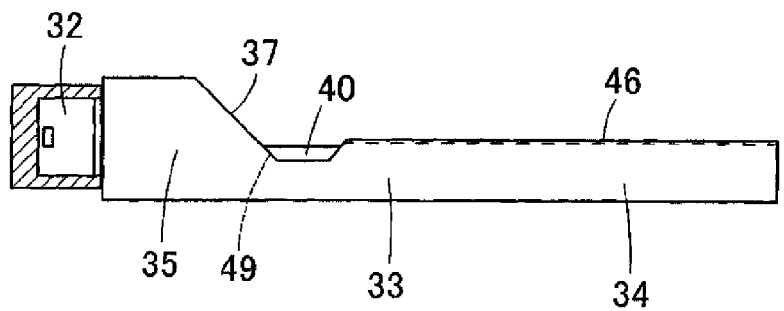
Figure 11:
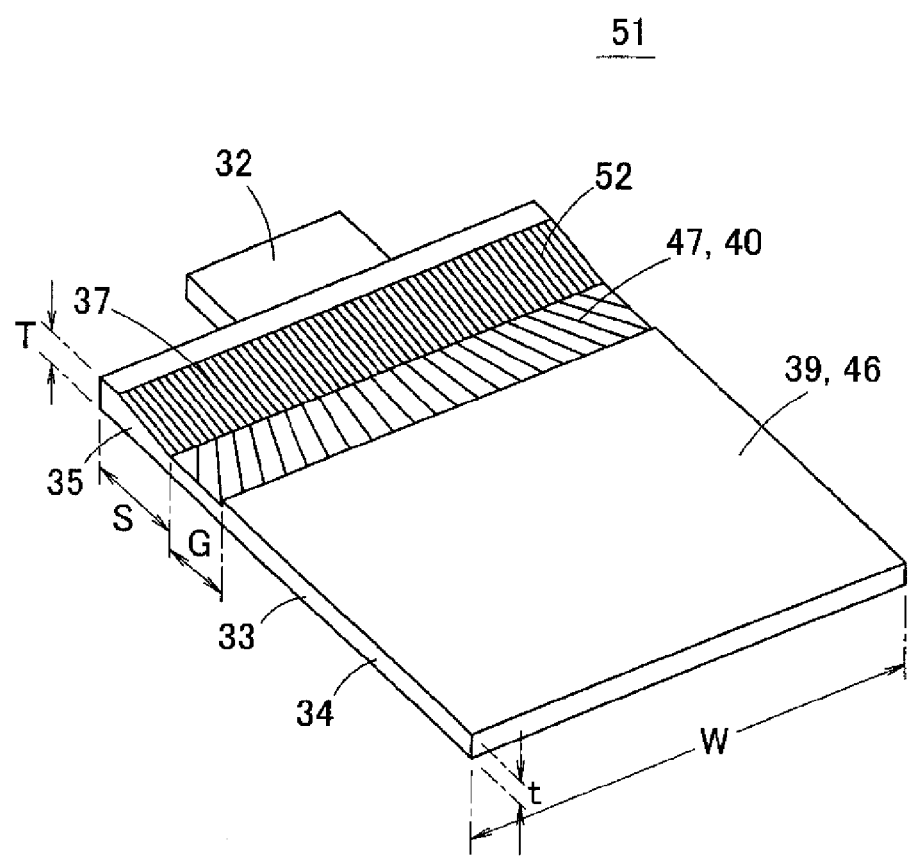
Figure 12A:
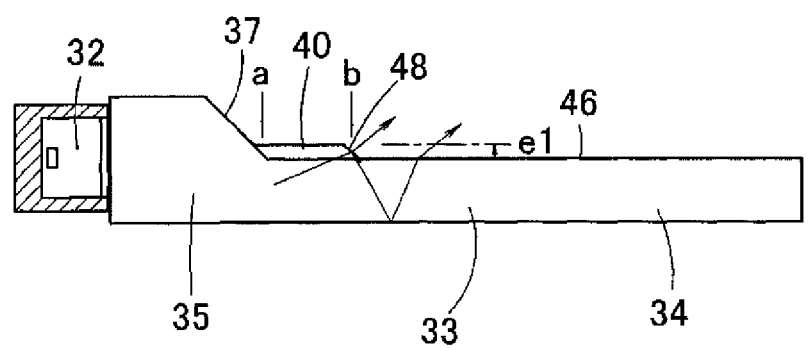
Figure 12B:
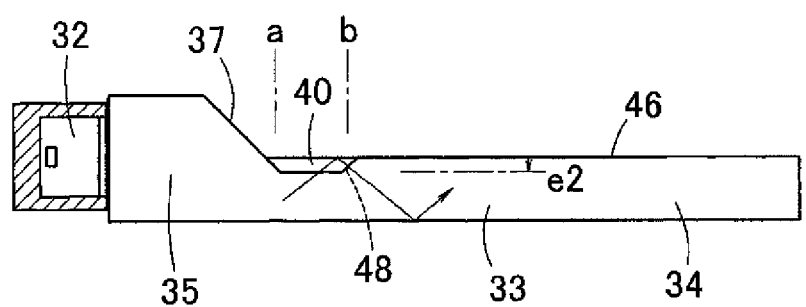
Figure 13A:
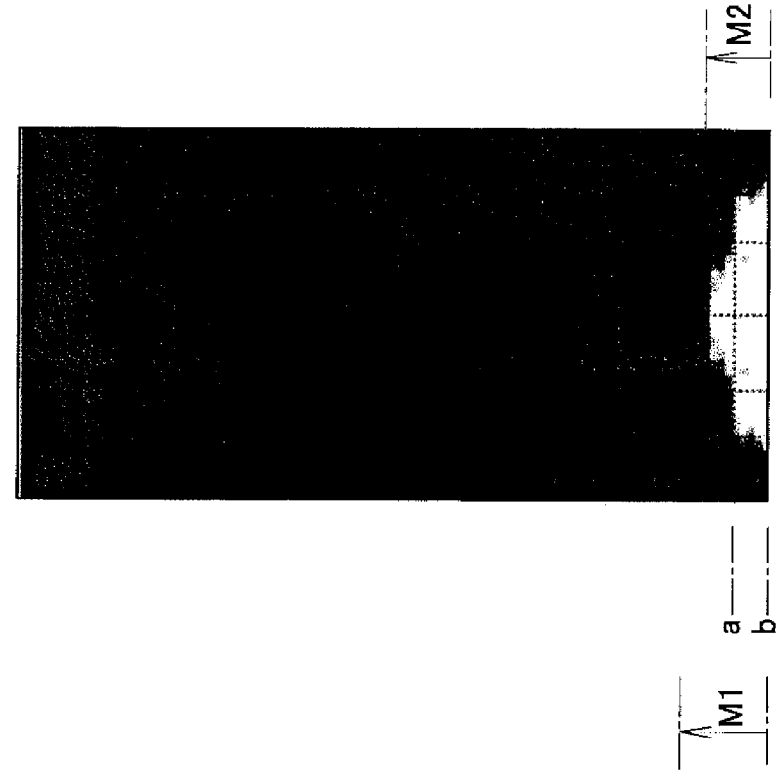
Figure 13B:
Figure 14:
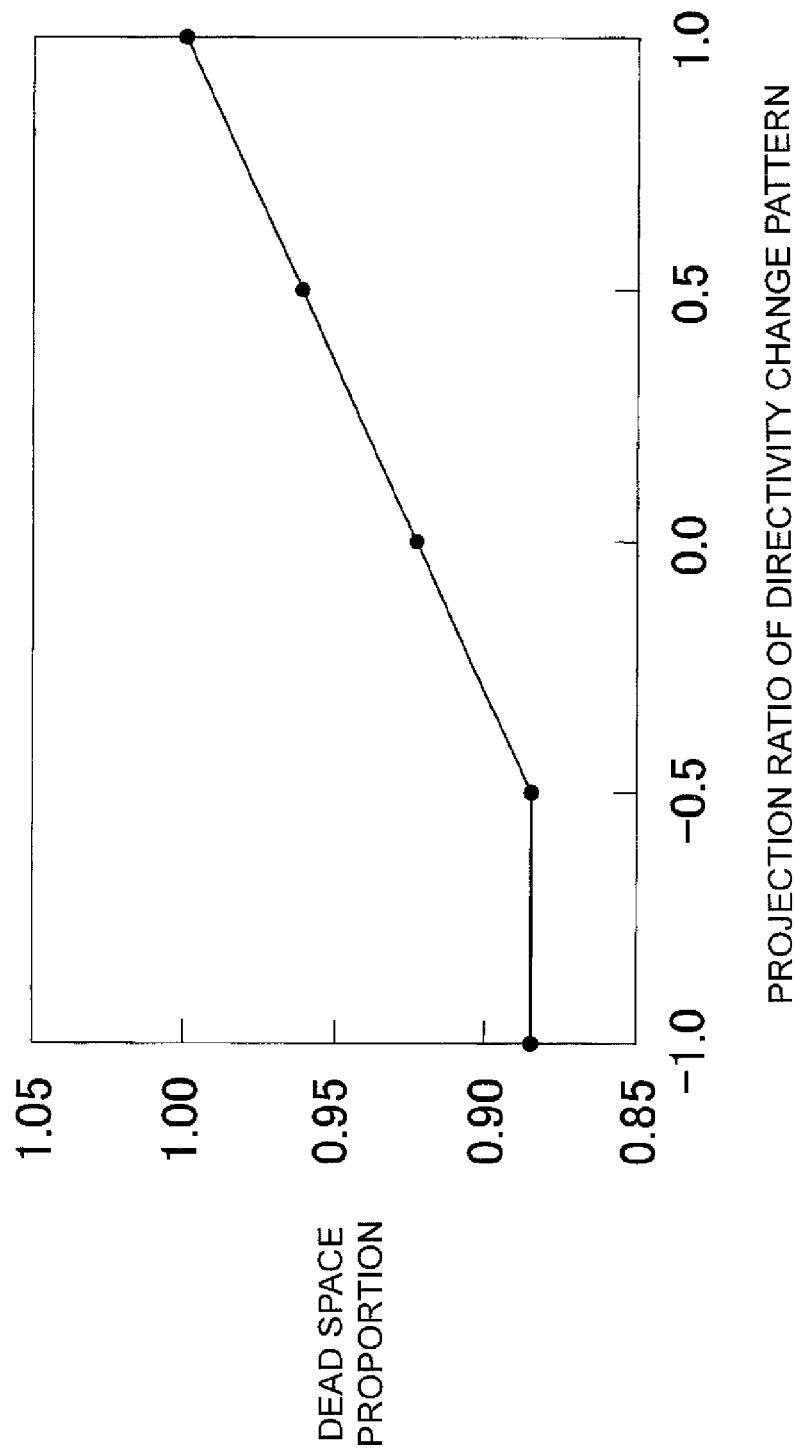
Figure 15:
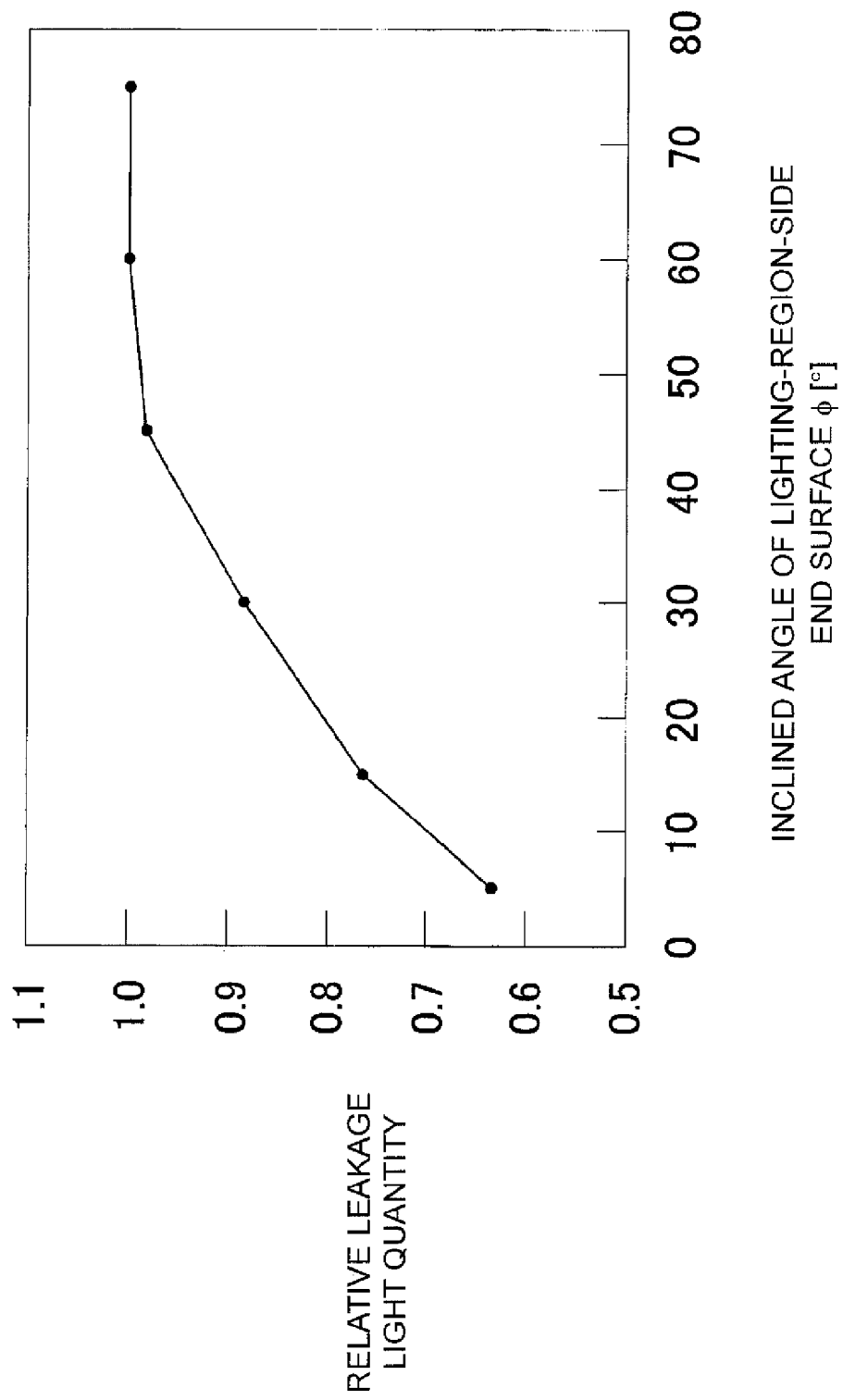
Figure 16A:
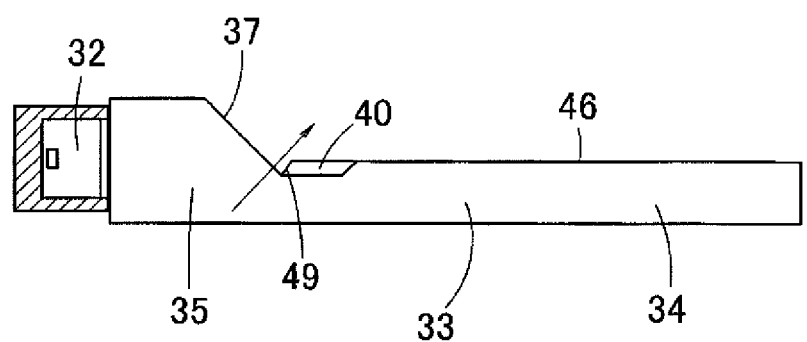
Figure 16B:
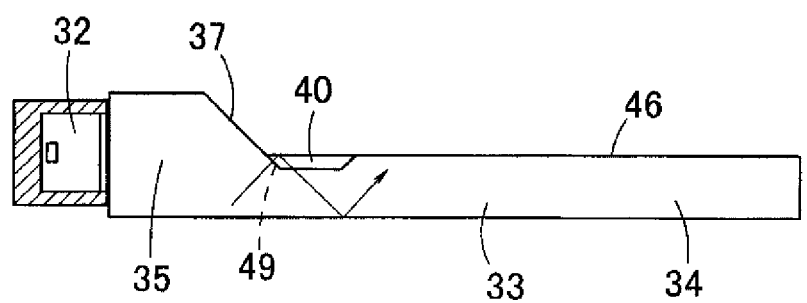
Figure 17:
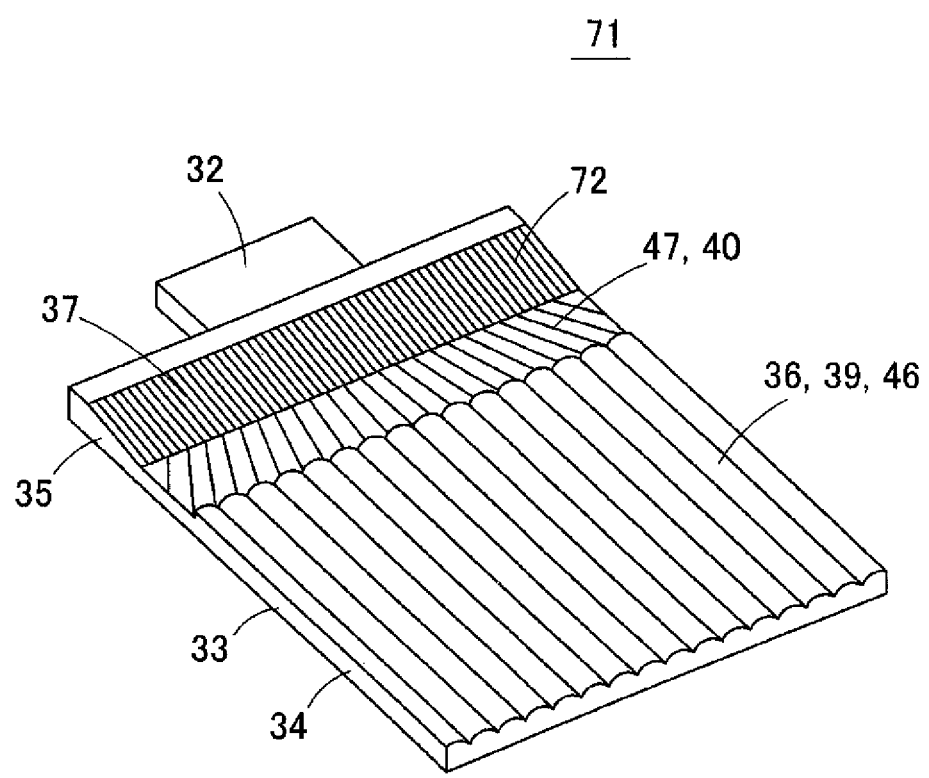
Figure 18:
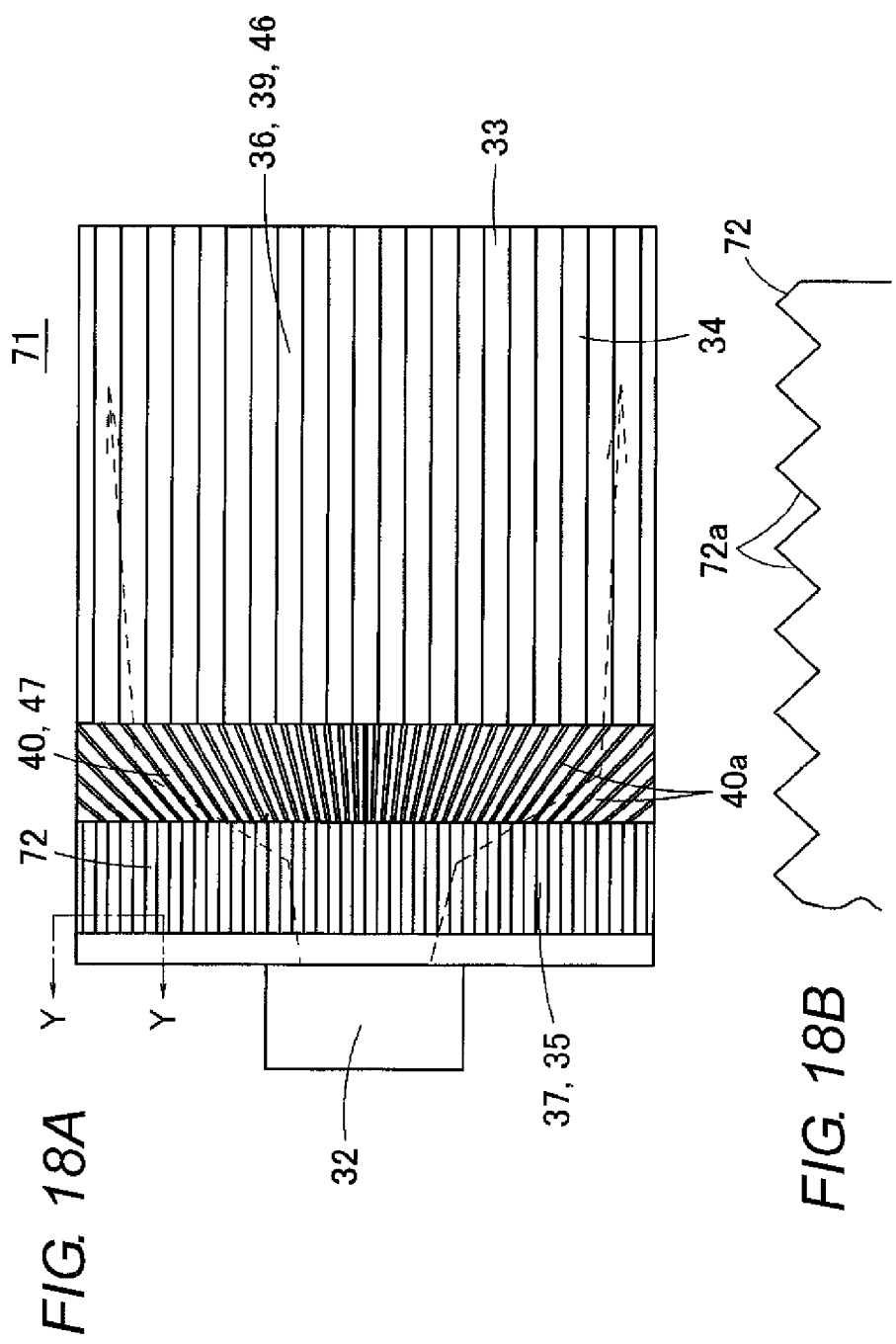
Figure 19:
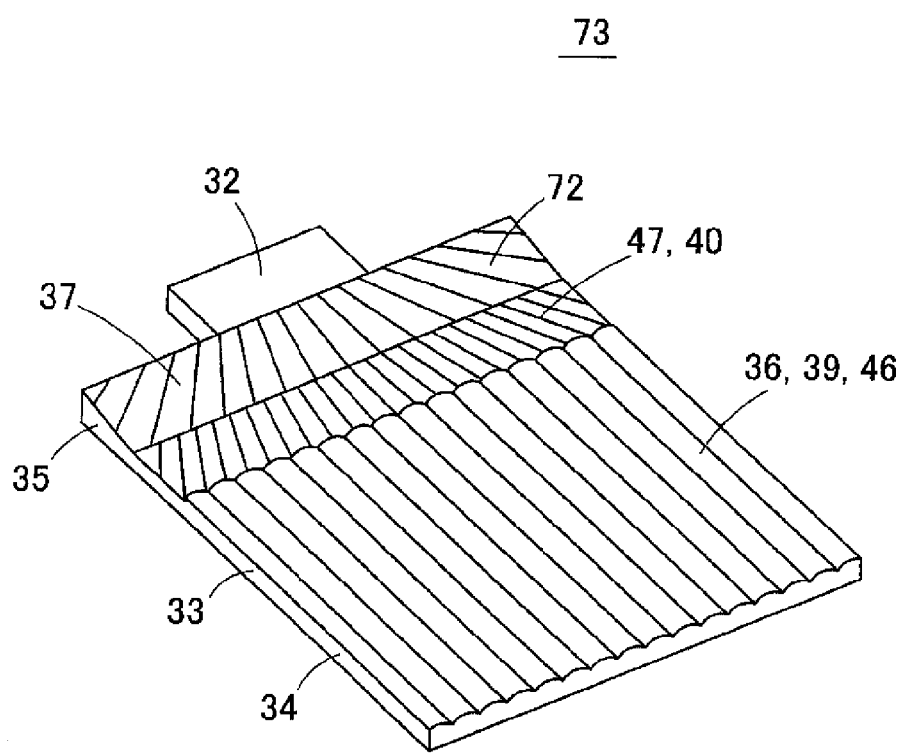
Figure 20:
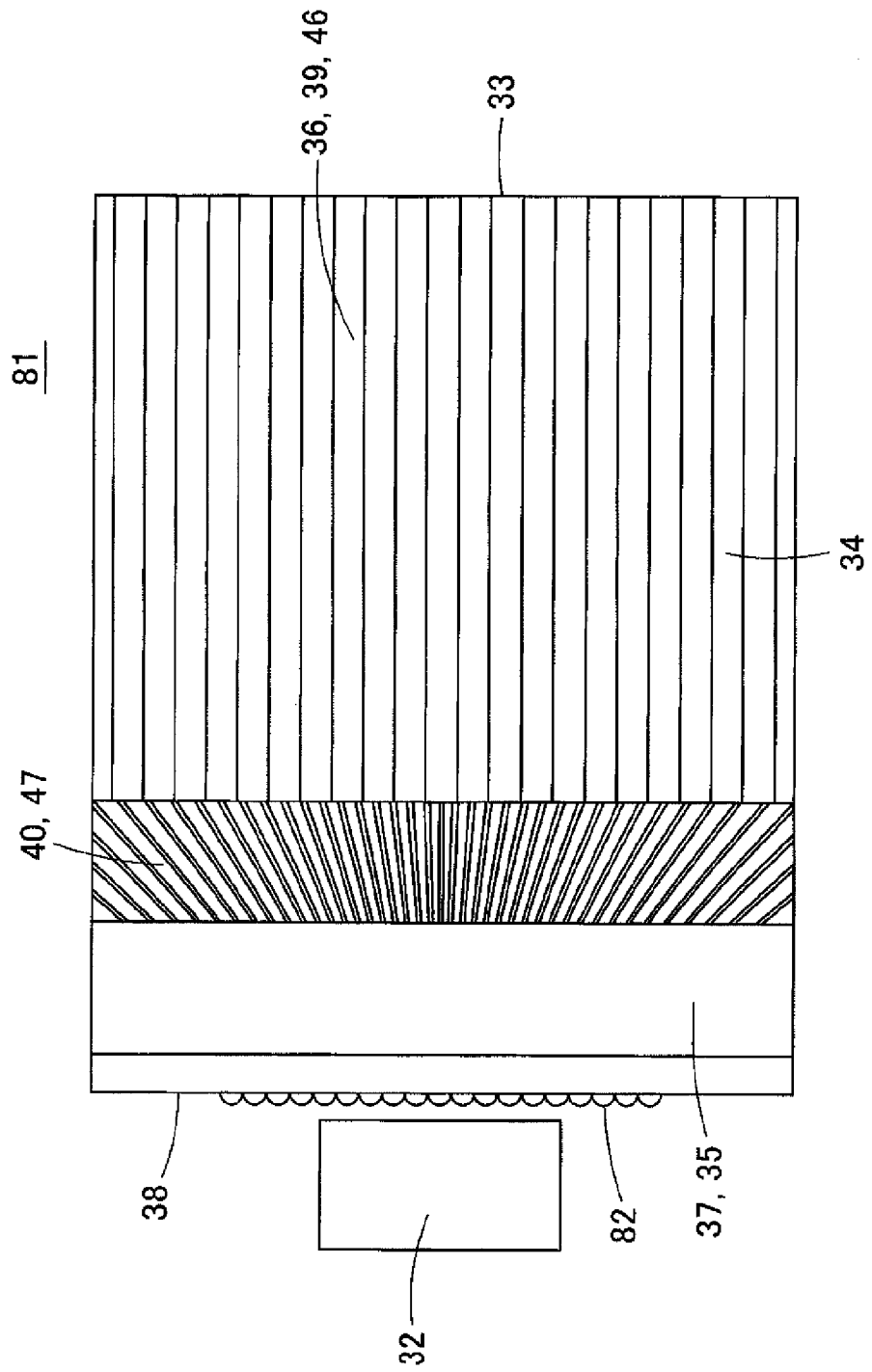
Figure 21:
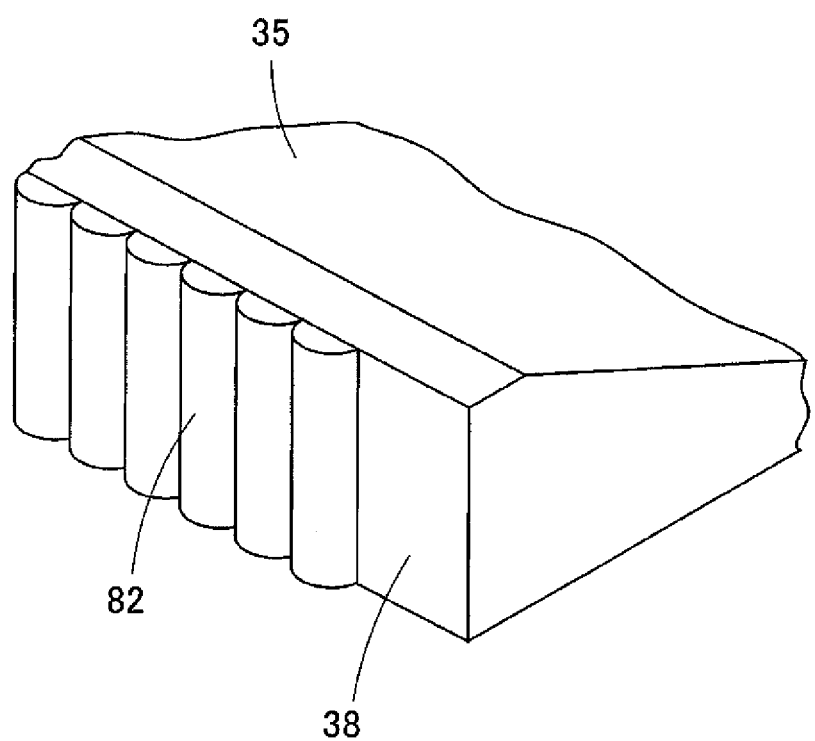
Figure 22:
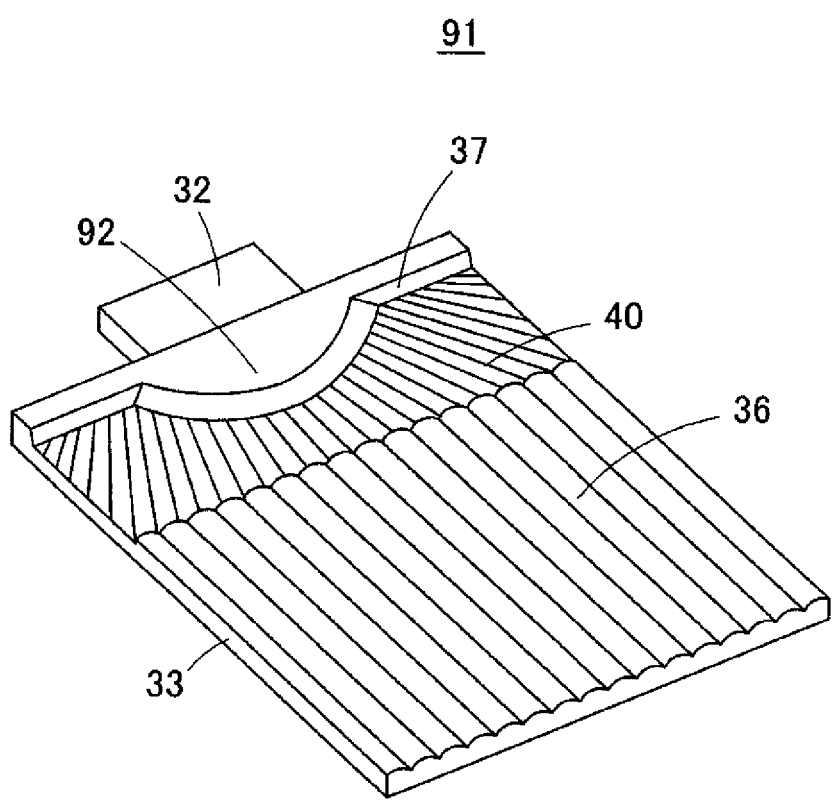
Figure 23:
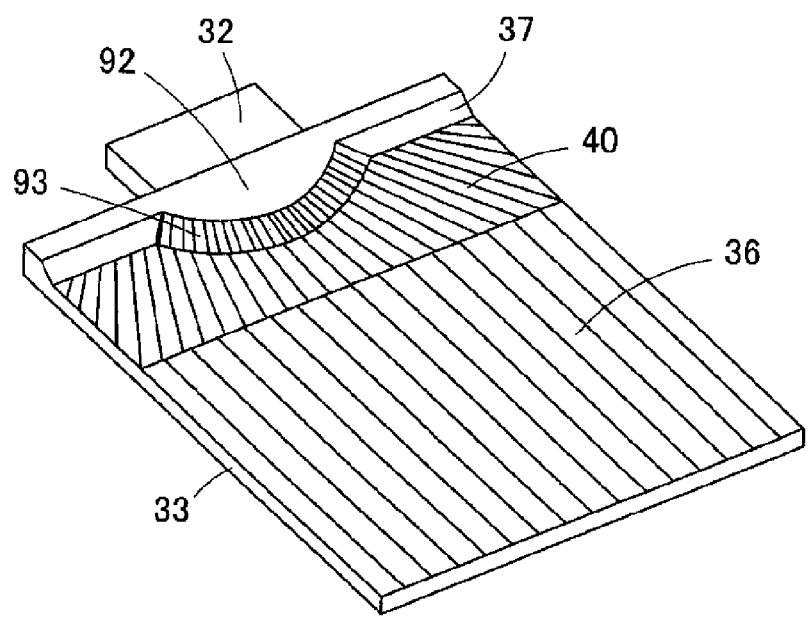
Figure 24:
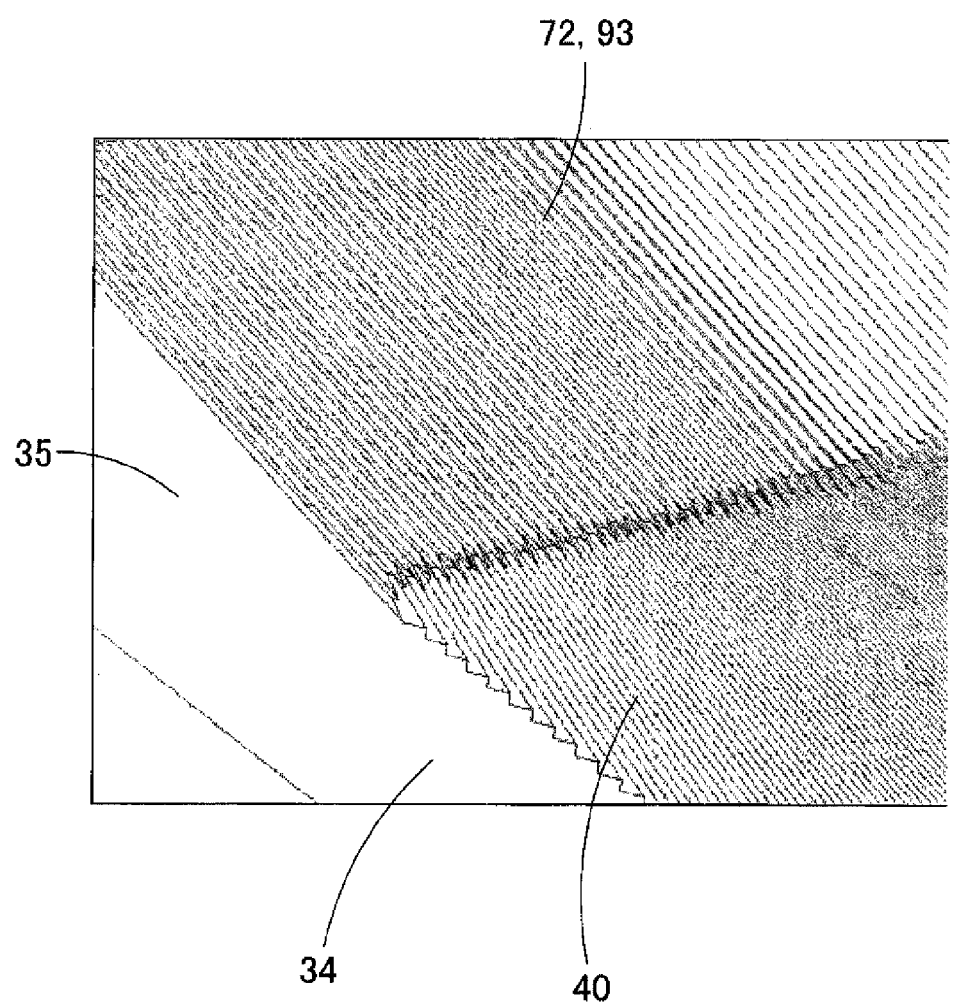
Figure 25:
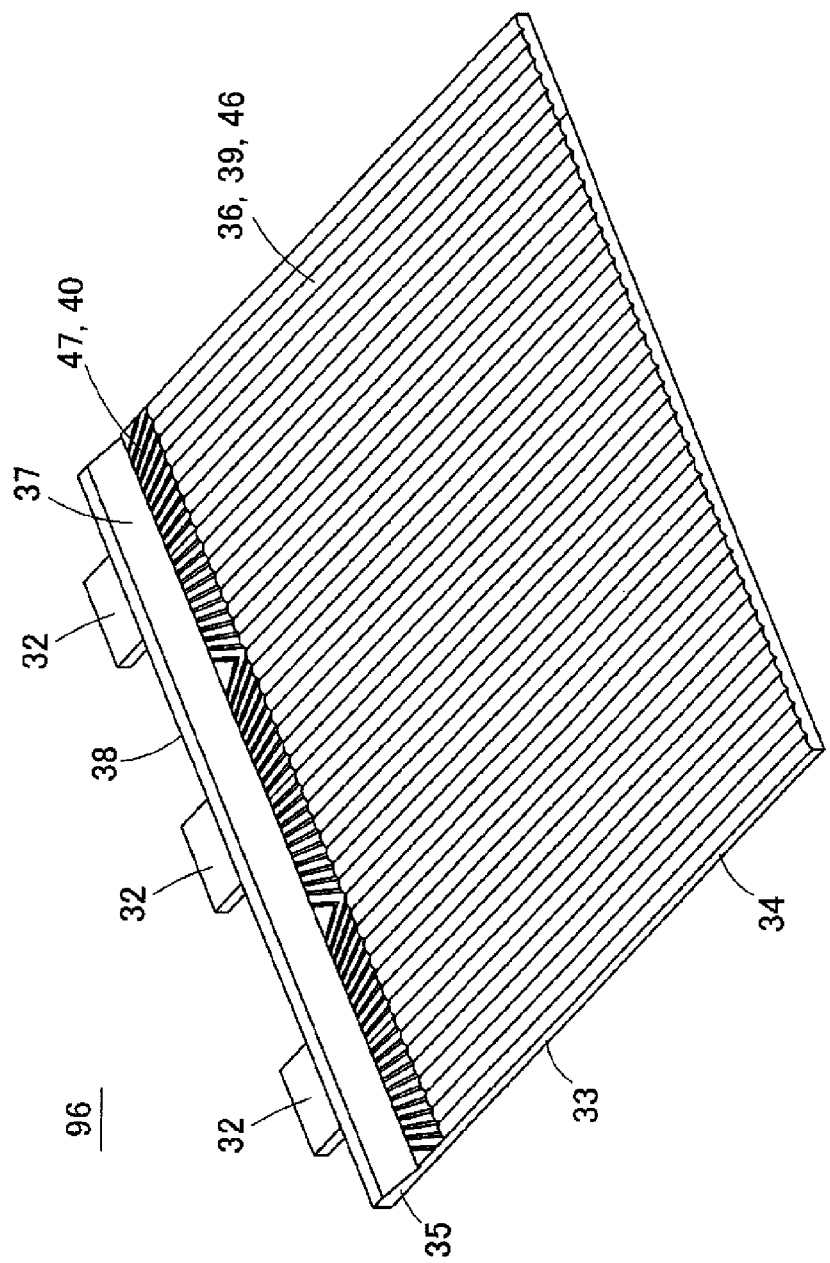
Figure 26:
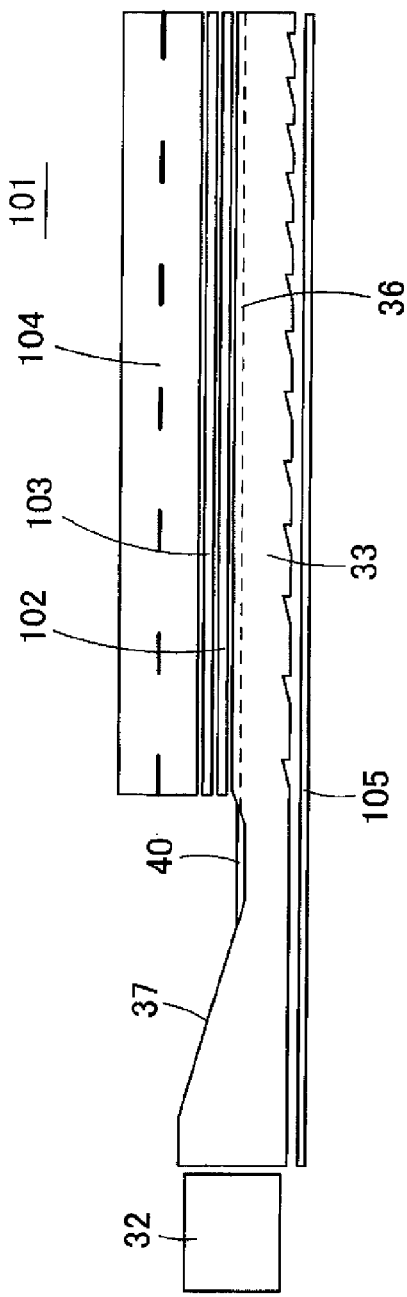
Figure 27:
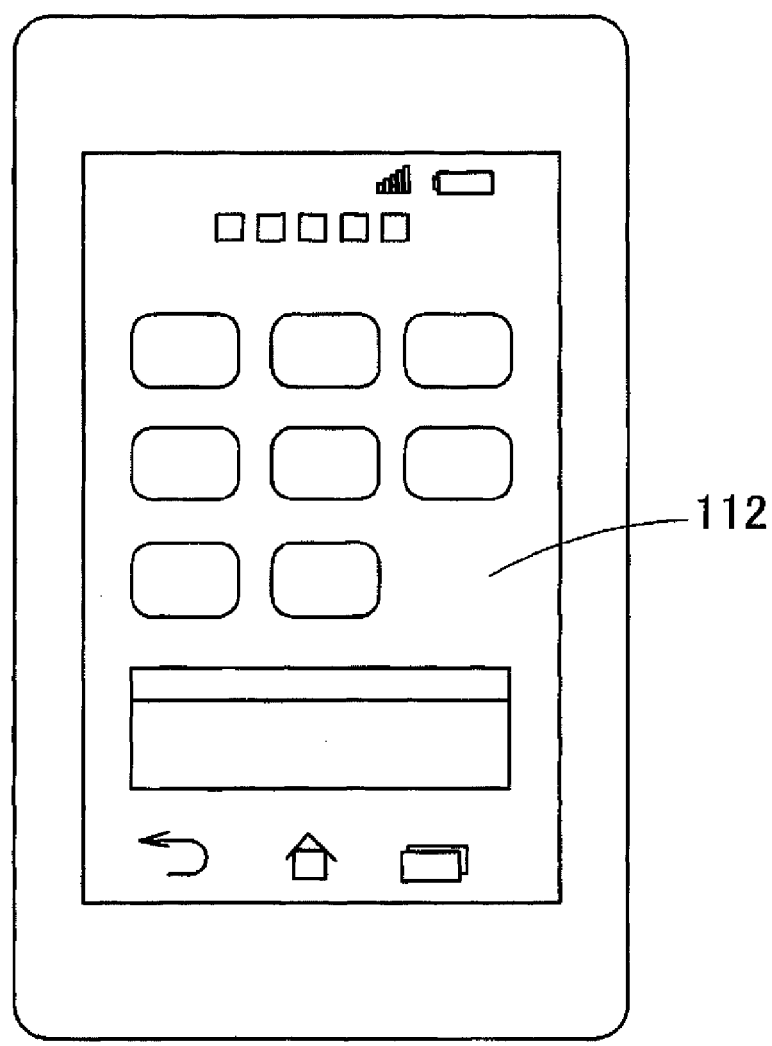

FIG. 5 is a schematic diagram illustrating a state in which eyespot luminescence is generated by light leaking from a lighting-region-side end surface of a directivity change pattern;

FIG. 6A is a plan view illustrating the area light source device of the first embodiment; FIG. 6B is an enlarged sectional view taken on a line X-X in FIG. 6A, and illustrates a sectional shape of a lenticular lens;

FIG. 7 is a schematic sectional view of the area light source device in FIG. 6;

FIG. 8 is a sectional view illustrating a shape of a directivity change pattern in a section parallel to a light incident surface and a partially enlarged section of the directivity change pattern;

FIG. 9 is a view illustrating a summation of widths of inward or outward normal lines and a method for obtaining an average angle of the inward or outward normal lines;

FIGS. 10A, 10B, and 10C are schematic diagrams illustrating a depth of the directivity change pattern;

FIG. 11 is a perspective view illustrating a sample used to measure a ratio of leakage light from a light guide plate;

FIG. 12A is a schematic diagram illustrating the area light source device in which the directivity change pattern is provided above a surface of a lighting region; FIG. 12B is a schematic diagram illustrating the area light source device in which the directivity change pattern is provided below the surface of the lighting region;

FIG. 13A is a photograph illustrating a luminance distribution of a light guide plate body in the area light source device in FIG. 12A; FIG. 13B is a photograph illustrating the luminance distribution of the light guide plate body in the area light source device in FIG. 12B;

FIG. 14 is a view illustrating a relationship between a projection ratio of the directivity change pattern and a dead space proportion;

FIG. 15 is a view illustrating a change in relative leakage light quantity when an inclined angle φ of the lighting-region-side end surface of the directivity change pattern;

FIG. 16A is a schematic diagram illustrating the area light source device in which a gap is formed between a light-introduction-part-side end surface of the directivity change pattern and an inclined surface; FIG. 16B is a schematic diagram illustrating the area light source device in which the light-introduction-part-side end surface of the directivity change pattern is connected to the inclined surface so as to pierce the inclined surface;

FIG. 17 is a perspective view illustrating an area light source device according to a second embodiment of the present invention;

FIG. 18A is a plan view of the area light source device in FIG. 17; FIG. 18B is a sectional view taken on a line Y-Y in FIG. 18A, and illustrates a sectional shape of the light diffusion pattern;

FIG. 19 is a perspective view illustrating an area light source device according to a modification of the second embodiment;

FIG. 20 is a plan view illustrating an area light source device according to a third embodiment of the present invention;

FIG. 21 is a partially enlarged perspective view illustrating a light introduction part of the area light source device in FIG. 20;

FIG. 22 is a perspective view illustrating an area light source device according to a fourth embodiment of the present invention;

FIG. 23 is a perspective view illustrating an area light source device according to a modification of the fourth embodiment;

FIG. 24 is a partially enlarged view illustrating a shape of a connection portion of the directivity change pattern and a light diffusion pattern;

FIG. 25 is a perspective view illustrating an area light source device according to a fifth embodiment of the present invention;

FIG. 26 is a sectional view illustrating a liquid crystal display device according to a sixth embodiment of the present invention; and FIG. 27 is a plan view illustrating a mobile device in which the area light source device according to one or more embodiments of the present invention is used.

DETAILED DESCRIPTION

Hereinafter, embodiments of the invention will be described in detail with reference to the accompanying drawings. However, the present invention is not limited to the following embodiments, but various design changes can be made without departing from the scope of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Configuration of First Embodiment

A configuration of a first embodiment of the present invention will be described below with reference to FIGS. 6A, 6B, 7, and 8. FIG. 6A is a plan view illustrating an area light source device 31 of the first embodiment. FIG. 6B is an enlarged sectional view taken on a line X-X in FIG. 6A, and illustrates a lenticular lens 36 provided on a surface of a light guide plate 33. FIG. 7 is a schematic sectional view along a vertical direction (a direction perpendicular to a light incident surface 38) of the area light source device 31, and illustrates a behavior of light beam in the light guide plate 33. FIG. 8 is a sectional view illustrating a shape of a directivity change pattern in a section parallel to a light incident surface and a partially enlarged section of the directivity change pattern. Because the area light source device 31 of the first embodiment is also illustrated by the perspective view in FIG. 3, the area light source device 31 of the first embodiment is also described with reference to FIG. 3 as appropriate. A basic configuration and optical action of the area light source device 31 of the first embodiment are described in detail in Japanese Patent Application No. 2012-59419.

The area light source device 31 includes a light source 32 in which a light source, namely an LED is used and a light guide plate 33. The light source 32 is provided with one or plural LEDs, and emits white light. As illustrated in FIG. 7, an LED 41 is sealed in a transparent sealing resin 42, the transparent sealing resin 42 is covered with a white resin 43 except a front surface thereof, and the front surface exposed from the white resin 43 of the transparent sealing resin 42 constitutes a light exit window 44 (an emission surface). The light source 32 is smaller than a width of the light guide plate 33, and sometimes the light source 32 is called a point light source while a cold-cathode tube is called a linear light source.

In the light guide plate 33, a light introduction part 35 is integrally molded at one end of a thin-plate-like light guide plate body 34 so as to be continuously joined to the light guide plate body 34. The light guide plate 33 is integrally molded using high-refractive-index transparent resins, such as an acrylic resin, polycarbonate (PC), a cycloolefin-based material, and polymethylmethacrylate (PMMA), or glass.

The light introduction part 35 is a thick portion having a substantially wedge shape in the light guide plate 33, and a light source 32 is disposed while partially facing the light incident surface 38 that is an end surface of the light introduction part 35. Because a thickness T of the end surface of the light introduction part 35 is greater than or equal to a height H of the light exit window 44, the light emitted from the light source 32 is efficiently incident to the light introduction part 35 through the light incident surface 38, and light use efficiency of the area light source device 31 is enhanced.

An inclined surface 37 is formed on the upper surface (the surface on the same side as a light exit surface 39) of the light introduction part 35. The inclined surface 37 is inclined downward from the maximum thickness portion near the light incident surface 38 toward the end of the light guide plate body 34. The belt-like inclined surface 37 extends from one of side edges of the light guide plate 33 to the other side edge. In the area light source 31 of the first embodiment, the inclined surface 37 is smoothly formed.

The light guide plate body 34 occupies a most part of an area of the light guide plate 33. A thickness t of the light guide plate body 34 is thinner than the maximum thickness T of the light introduction part 35, thereby achieving the low profile of the light guide plate 33. The light guide plate body 34 has a flat-plate shape in which the surface and the rear surface are parallel to each other, and the light guide plate body 34 has the substantially even thickness. As illustrated in FIG. 6A, a most part of the light guide plate body 34 constitutes a lighting region 46 for emitting light, and an end-portion region adjacent to the light introduction part 35 constitutes a pattern forming region 47.

In the lighting region 46, a region where the light that is effective for the lighting, namely, the light having the even luminance is output is called an effective lighting region. The effective lighting region corresponds to a display region of a liquid crystal panel overlapping with the area light source device 31. That is, the effective lighting region is a region, in which the region (for example, the region where the eyespot luminescence is generated) shining with the uneven luminance is removed from a region (a lighting region 46) where a pattern forming region 47 is removed from the light guide plate body 34.

The upper surface of the lighting region 46 constitutes the light exit surface 39, and the lenticular lens 36 is molded on the light exit surface 39. As illustrated in FIGS. 6A and 6B, the lenticular lens 36 is constructed by horizontally arraying convex lenses that extend in parallel with a vertical direction of the light guide plate body 34, and the lenticular lens 36 serves to horizontally spread a directional pattern of the light output from the light exit surface 39. In the lighting region 46, a light output part 45 is provided on an opposite surface (the lower surface) of the light exit surface 39. In FIG. 7, a triangular groove pattern is illustrated as the light exit part 45. Alternatively, for example, a pattern formed by sandblasting, a pattern formed by photographic printing using diffusion ink, a diffraction grating pattern, and any irregular pattern may be used as the light exit part 45. The light exit part 45 may be provided in the light exit surface 39 of the light guide plate body 34 or in both the light exit surface 39 and the opposite surface of the light exit surface 39.

The pattern forming region 47 is located in the end portion of the light guide plate body 34, and is a belt-like region located between the end (the lower end of the inclined surface 37) of the light introduction part 35 and the end of the lighting region 46. A directivity change pattern 40 is provided in the upper surface and/or the lower surface of the pattern forming region 47. As illustrated in FIGS. 6A and 8, plural pattern elements 40a having V-groove shapes are radially arrayed in the directivity change pattern 40. When viewed in the direction perpendicular to the light exit surface 39, each pattern element 40a passes through an emission center of the light source 32, and is inclined with respect to a virtual straight line (hereinafter referred to as an optical axis C of the light source 32) perpendicular to the light incident surface 38, and the inclined directions of the pattern elements 40a are opposite to each other with respect to the optical axis C. In each pattern element 40a, an angle with the optical axis C increases gradually with increasing distance from the optical axis C.

As illustrated in FIG. 8, each pattern element 40a is constructed by two slopes, which have different inclined angles and different inclined directions in the section parallel to the light incident surface 38, and the pattern element 40a has an asymmetric V-groove shape. Accordingly, slopes having the different inclined directions are alternately arrayed in the directivity change pattern 40.

The sectional shape of the directivity change pattern 40 has the following feature. In the section parallel to the light incident surface 38, assuming that a normal line N is drawn outward from the inside of the light guide plate 33 in the slope of each pattern element 40a, a summation of widths D2 of slopes 50b in each of which the normal line N is inclined onto an opposite side of a perpendicular line C' orthogonal to the optical axis C is larger than a summation of widths D1 of slopes 50a in each of which the normal line N is inclined onto the side of the perpendicular line C'. At this point, each of the summation of the widths D2 of the slopes 50b and the summation of the widths D1 of the slopes 50a is individually calculated in the right region and the left region of the optical axis C, and the summation of the widths D2 of the slopes 50b is larger than the summation of the widths D1 of the slopes 50a on both the sides of the optical axis C. Particularly, in the example in FIG. 8, the width D2 of the slope 50b in which the normal line N is inclined onto the opposite side of the perpendicular line C' is larger than the width D1 of the slope 50a in which the normal line N is inclined onto the side of the perpendicular line C' for the two slopes 50a and 50b that are adjacent to each other at any point.

Referring to FIG. 9, the feature of the sectional shape of the directivity change pattern 40 can also be expressed as follows. An average angle of angles α (or the inclined angles of the slopes 50a) each of which is formed between the perpendicular line C' and the normal line N of the slope 50a inclined onto the side of the perpendicular line C' is larger than an average angle of angles β (or the inclined angles of the slopes 50b) each of which is formed between the perpendicular line C' and the normal line N of the slope 50b inclined onto the side of the perpendicular line C'. As used herein, the average angle of the angles α each of which is formed between the perpendicular line C' and the normal line N of the slope 50a inclined onto the side of the perpendicular line C' is defined by $$\Sigma \alpha i \times D1i / \Sigma D1i$$

Where αi is an angle formed between the perpendicular line C' and the normal line N of the slope 50a inclined onto the side of the perpendicular line C', and D1i is a width of each slope 50a (i is an index added to each slope 50a). The summations of a denominator and a numerator are calculated with respect to the slope 50a in the right or left region of the optical axis C. Similarly, the average angle of the angles β each of which is formed between the perpendicular line C' and the normal line N of the slope 50b inclined onto the opposite side of the perpendicular line C' is defined by $$\Sigma \beta j \times D2j / \Sigma D2j$$

Where βi is an angle formed between the perpendicular line C' and the normal line N of the slope 50b inclined onto the opposite side of the perpendicular line C', and D2j is a width of each slope 50b (j is an index added to each slope 50b). The summations of a denominator and a numerator are calculated with respect to the slope 50b in the right or left region of the optical axis C. The average angles are compared to each other in each of the right and left regions of the optical axis C. Particularly, in the example in FIG. 8, the angle α formed between the perpendicular line C' and the normal line N of the slope 50a inclined onto the side of the perpendicular line C' is larger than the angle β formed between the perpendicular line C' and the normal line N of the slope 50b inclined onto the opposite side of the perpendicular line C' for the two slopes 50a and 50b that are adjacent to each other at any point.

In at least some directivity change patterns 40 (some pattern elements 40a), according to one or more embodiments of the present invention, all the directivity change patterns 40 (all the pattern elements 40a), a valley line (a local minimum portion) is located below the surface of the lighting region 46 (inside the light guide plate body 34). In FIG. 10A, a ridge line (a local maximum portion) of the directivity change pattern 40 is located above the surface of the lighting region 46, and the valley line is located below the surface of the lighting region 46. In FIG. 10B, the ridge line (the local maximum portion) of the directivity change pattern 40 is located at the same level as the surface of the lighting region 46, and the valley line is located below the surface of the lighting region 46. In FIG. 10C, the ridge line of the directivity change pattern 40 is located below the surface of the lighting region 46, and the valley line is located below the surface of the lighting region 46. The surface of the lighting region 46 means a surface that is located at the same level as a vertex of the lenticular lens 36 provided in the lighting region 46.

For the case in FIGS. 10A to 10C, in a lighting-region-side end surface of the directivity change pattern 40, a portion located above the surface of the lighting region 46 is inclined downward toward the lighting region 46, and a portion located below the surface of the lighting region 46 is inclined upward toward the lighting region 46. At this point, in the directivity change pattern 40, desirably an angle (inclined angle) φ formed between the surface of the lighting region 46 and a lighting-region-side end surface 48 located above the surface of the lighting region 46 is less than or equal to 45°. In the lighting-region-side end surface of the directivity change pattern 40, desirably a portion located below the surface of the lighting region 46 is inclined upward toward the lighting region 46 for the convenience of mold release in molding. However, the portion located below the surface of the lighting region 46 is not limited to the inclination. For example, the portion located below the surface of the lighting region 46 may be a surface perpendicular to the surface of the lighting region 46, or inclined downward toward the lighting region 46 like the portion located above the surface of the lighting region 46.

A light-introduction-part-side end surface 49 of the directivity change pattern 40 (the pattern element 40a) is connected to the inclined surface 37 of the light introduction part 35 so as to pierce the inclined surface 37. "The light-introduction-part-side end surface 49 of the directivity change pattern 40 is connected to the inclined surface 37 of the light introduction part 35 so as to pierce the inclined surface 37" means that a gap does not exist between the light-introduction-part-side end surface 49 of the directivity change pattern 40 and the inclined surface 37. Alternatively, it means that the light-introduction-part-side end surface 49 of the directivity change pattern 40 is not exposed to an outer surface of the light guide plate 33.

In the drawings, optical patterns of the lenticular lens 36 and directivity change pattern 40 are coarsely drawn for the sake of convenience. However, actually the optical patterns are finely formed with micrometer accuracy.

In the area light source device 31, the light emitted from the light source 32 is incident to the light introduction part 35 through the light incident surface 38, the light is reflected by the upper or lower surface of the light introduction part 35 or passes through the light introduction part 35, and the light is introduced to the thin light guide plate body 34. The light introduced to the light guide plate body 34 is guided in the light guide plate body 34 while reflected by the directivity change pattern 40, the lenticular lens 36, and the lower surface of the light guide plate body 34. Then the light is reflected or diffused by the light exit part 45, and substantially evenly output from the light exit surface 39.

Because the directivity change pattern 40 is disposed so as to be inclined with respect to the optical axis C, as illustrated in FIGS. 3 and 6, light L2 incident to the directivity change pattern 40 is reflected and bent by the directivity change pattern 40 so as to come close to the direction parallel to the optical axis C, namely, the light is changed by the directivity change pattern 40 such that the angle with the optical axis C decreases as much as possible. As a result, in the area light source device 31 of the first embodiment, the light reflected by the directivity change pattern 40 hardly reaches the side surface of the light guide plate 33, and the light is hardly incident to the lenticular lens 36 from the horizontal direction. Therefore, the leakage of the light from the side surface of the light guide plate 33 or the lenticular lens 36 can be reduced to enhance the light use efficiency, and the luminance of the area light source device 31 can be improved.

Additionally, in the directivity change pattern 40 of the first embodiment, an angle formed between the pattern element 40a and the optical axis C increases with increasing distance from the optical axis C. In the light incident from the light source 32 to the pattern element 40a, the angle with the length direction of the pattern element 40a increases with increasing distance from the optical axis C. Accordingly, the angle formed between the pattern element 40a and the optical axis C is increased with increasing distance from the optical axis C, which allows the light to be bent forward irrespective of the distance from the optical axis C.

However the light reflected by the directivity change pattern 40 is not always bent to the direction parallel to the optical axis C. The whole directional pattern of the light reflected by the directivity change pattern 40, particularly a maximum luminance direction of the light is changed so as to be oriented toward the direction parallel to the optical axis C.

According to an experimental result, in the case that the directivity change pattern 40 was not provided in the pattern forming region 47, the light leaking from the pattern forming region 47 was 15% of the light incident through the light incident surface 38. On the other hand, in the case that the directivity change pattern 40 was provided in the pattern forming region 47, the light leaking from the pattern forming region 47 decreased to 5% of the light incident through the light incident surface 38. FIG. 11 is a perspective view illustrating an area light source device 51 that is of a sample used in the experiment. In the area light source device 51 of the sample, a light diffusion pattern 52 is formed on the inclined surface 37 of the light introduction part 35 in order to horizontally spread the directivity of the reflected light. In the light diffusion pattern 52, V-grooves extending in the vertical direction are arrayed in parallel with one another. The light is horizontally spread by providing the light diffusion pattern 52, and the light is sent to the side surface direction of the light guide plate 33, thereby preventing darkening of the side edge portion of the light exit surface 39. Additionally, the directional pattern of the light sent to the side surface direction is changed to the direction parallel to the optical axis C by the directivity change pattern 40, whereby the light hardly leaks from the side surface of the light guide plate 33 or the lighting region 46. On the other hand, the lenticular lens 36 of the lighting region 46 is eliminated.

Dimensions of each portion of the sample used in the experiment were set as follows.

width of light exit window of light source 32: 2 mm
width W of light guide plate 33: 5.5 mm
maximum thickness T of light introduction part 35: 0.42 mm
length S of light introduction part 35: 1.5 mm
thickness t of light guide plate body 34: 0.23 mm
length G of pattern forming region 47: 1.5 mm
refractive index n of light guide plate 33: 1.59

According to the experimental result, a ratio of the leakage light can be decreased to ⅓ (15%→5%) by providing the directivity change pattern 40 in the pattern forming region 47. Although the sample (the area light source device 51) used in the experiment further includes an element added to the area light source device 31 of the first embodiment, the leakage light can substantially be decreased to the same level in the area light source device 31 of the first embodiment.

A height of the directivity change pattern 40 will be described below. FIG. 12A is a schematic diagram illustrating a comparative example in which the directivity change pattern 40 is provided above the lighting region 46. FIG. 12B is a schematic diagram illustrating the area light source device of the first embodiment in which the directivity change pattern 40 is provided below the lighting region 46. In the case that the directivity change pattern 40 is projected upward from the lighting region 46 as illustrated in FIG. 12A, part of the light incident to the light guide plate body 34 through the light introduction part 35 leaks easily from the lighting-region-side end surface 48 of the directivity change pattern 40. As a result, the eyespot luminescence (see FIG. 5) generated in the end portion of the lighting region 46 is enlarged to increase the unevenness of the luminance, and the effective lighting region is narrowed by the enlarged eyespot luminescence. Therefore, an area that can actually be used as the area light source is reduced to degrade the efficiency of the area light source device.

On the other hand, in the case that the directivity change pattern 40 is located below the lighting region 46 as illustrated in FIG. 12B, the lighting-region-side end surface 48 of the directivity change pattern 40 is connected to the lighting region 46 so as to pierce the lighting region 46. Therefore, the light incident to the directivity change pattern 40 returns to the lighting region 46 even if the light passes through the lighting-region-side end surface 48, and the light hardly leaks to the outside. As a result, the eyespot luminescence generated in the end portion of the lighting region 46 is reduced, and the effective lighting region is enlarged by the reduced eyespot luminescence. Therefore, the area that can actually be used as the area light source is enlarged to improve the efficiency of the area light source device.

FIG. 13A is a photograph illustrating a luminance distribution of the light guide plate body during the emission of the comparative example in FIG. 12A in which the directivity change pattern 40 is provided above the lighting region 46. An a line in FIG. 13A indicates a position of an end (the light-introduction-part-side end surface of the directivity change pattern 40) of the light guide plate body 34 in FIG. 12A, and a b line in FIG. 13A indicates a position of a boundary (the lighting-region-side end surface of the directivity change pattern 40) between the pattern forming region 47 and the lighting region 46 in FIG. 12A. As illustrated in FIG. 13A, in the comparative example, the region having the uneven luminance invades largely into the lighting region 46, a range indicated by a dead space length M1 constitutes a dead space that cannot be used as the area light source. That is, the region where the dead space indicated by the dead space length M1 is removed constitutes the effective lighting region.

On the other hand, the photograph in FIG. 13B illustrates the luminance distribution during the emission of the light guide plate body of the first embodiment, in which the directivity change pattern 40 is provided below the lighting region 46 as illustrated in FIG. 12B. An a line in FIG. 13B also indicates the position of the end (the light-introduction-part-side end surface of the directivity change pattern 40) of the light guide plate body 34 in FIG. 12B, and a b line in FIG. 13B also indicates the position of the boundary (the lighting-region-side end surface of the directivity change pattern 40) between the pattern forming region 47 and the lighting region 46 in FIG. 12B. As illustrated in FIG. 13B, in the first embodiment, the region having the large and uneven luminance is reduced, and the dead space indicated by a dead space length M2 is decreased compared with the comparative example. That is, the effective lighting region of the first embodiment is enlarged larger than the effective lighting region of the comparative example, and the efficiency of the area light source device is improved.

The samples of the comparative example and first embodiment, which are used in the observations in FIGS. 13A and 13B, have the dimensions identical to those of the sample in FIG. 11. In the comparative example in FIG. 13A, the directivity change pattern 40 having the height of 10 μm, which is projected from the lighting region 46 by e1=10 μm, is formed in the pattern forming region 47. In the first embodiment in FIG. 13B, the directivity change pattern 40 having the height of 10 μm is provided at a depth of e2=10 μm from the lighting region 46. Most of the region is blackened in FIGS. 13A and 13B only because the luminance is lower than that of the portion in which the eyespot luminescence is generated. The black region is also the emission region.

FIG. 14 is a view illustrating a relationship between a projection ratio of the directivity change pattern 40 and a dead space proportion (experimental values). As used herein, the projection ratio of the directivity change pattern means a ratio of a height of the portion projected from the lighting region to a height of the directivity change pattern. Namely, projection ratio of directivity change pattern=(height to ridge line of directivity change pattern measured from surface of lighting region)÷(height of directivity change pattern).

The dead space proportion means a ratio of each dead space length to the dead space length (M1 in FIG. 13A) in the case that the whole directivity change pattern 40 is projected upward from the surface of the lighting region 46 as illustrated in FIG. 12A (that is, in the case that the valley line of the directivity change pattern 40 is located at the same level as the surface of the lighting region 46). For example, the directivity change pattern has the projection ratio of 1 in FIG. 12A, the directivity change pattern has the projection ratio of 0.5 in FIG. 10A, and the directivity change pattern has the projection ratio of 0 in FIG. 12B.

Referring to FIG. 14, in the case that the projection ratio of the directivity change pattern 40 is decreased, the dead space proportion becomes about 0.88 when the projection ratio is −0.5, and the dead space proportion is not decreased any more even if the projection ratio is less than −0.5. Therefore, from the viewpoint of design, the depth from the lighting region 46 to the ridge line of the directivity change pattern 40 according to one or more embodiments of the present invention becomes ½ (the projection ratio of −0.5) of the height of the directivity change pattern 40 (see FIG. 10C).

FIG. 15 illustrates a change in relative leakage light quantity when the inclined angle φ (see FIG. 10A) of the lighting-region-side end surface 48 of the directivity change pattern 40 is changed while a distance (a difference in height) between the lighting region 46 and the ridge line of the directivity change pattern 40 is kept constant. As used herein, the relative leakage light quantity means a ratio of a leakage light quantity at an angle φ to a leakage light quantity at an inclined angle φ of 90°. As can be seen from FIG. 15, the relative leakage light quantity is not substantially changed when the inclined angle φ is equal to or greater than 45°, but the relative leakage light quantity is decreased with decreasing inclined angle φ when the inclined angle φ is less than or equal to 45°. Therefore, the inclined angle φ of the lighting-region-side end surface 48 of the directivity change pattern 40 is less than or equal to 45° as described above.

A shape of the light-introduction-part-side end surface 49 of the directivity change pattern 40 will be described below. FIG. 16A is a schematic diagram illustrating the area light source device in which the gap is formed between the light-introduction-part-side end surface 49 of the directivity change pattern 40 and the inclined surface 37. FIG. 16B is a schematic diagram illustrating the area light source device in which the light-introduction-part-side end surface 49 of the directivity change pattern 40 is connected to the inclined surface so as to pierce the inclined surface.

In the case that the gap is generated between the light-introduction-part-side end surface 49 of the directivity change pattern 40 and the inclined surface 37, as indicated by an arrow in FIG. 16A, the light leaks easily from the point facing the light-introduction-part-side end surface 49 of the inclined surface 37, the light use efficiency is degraded, and the eyespot luminescence is generated around the light-introduction-part-side end surface 49. On the other hand, in the case that the light-introduction-part-side end surface 49 of the directivity change pattern 40 is connected to the inclined surface so as to pierce the inclined surface, as indicated by an arrow in FIG. 16B, the light passing through the light-introduction-part-side end surface 49 is reflected by the directivity change pattern 40 to return to the light guide plate body 34. Therefore, when the light-introduction-part-side end surface 49 of the directivity change pattern 40 is connected to the inclined surface so as to pierce the inclined surface, the generation of the eyespot luminescence can be reduced around the light-introduction-part-side end surface 49 while the light use efficiency is improved.

Second Embodiment

FIG. 17 is a perspective view illustrating an area light source device 71 according to a second embodiment of the present invention. FIG. 18A is a plan view of the area light source device 71. FIG. 18B is a sectional view taken on a line Y-Y in FIG. 18A.

In the area light source device 71 of the second embodiment, a light diffusion pattern 72 is formed on the upper surface and/or lower surface of the light introduction part 35 in order to horizontally spread the directivity of the reflected light. As illustrated in FIG. 18B, the light diffusion pattern 72 may be formed by arraying vertically-extending V-grooves 72a in parallel with one another, or the light diffusion pattern 72 may be a pattern having a lenticular-lens shape or a random shape. In the structure of the second embodiment, the light is sent to the side surface direction of the light guide plate 33 while horizontally spread by the light diffusion pattern 72, thereby preventing darkening of a side edge portion of the light exit surface 39. Additionally, the directional pattern of the light sent to the side surface direction is changed to the direction parallel to the optical axis C by the directivity change pattern 40, whereby the light hardly leaks from the side surface of the light guide plate 33 or the lenticular lens 36.

When the light diffusion pattern 72 is constructed by the V-grooves 72a, the light hardly leaks to the outside from the inclined surface 37 or the light introduction part 35, and the light incident to the light introduction part 35 from the light source 32 can be introduced to the light guide plate body 34 with a low loss.

(Modification)

FIG. 19 is a perspective view illustrating an area light source device 73 according to a modification of the second embodiment. In the area light source device 73, the light diffusion pattern 72 is radially formed in order to horizontally spread the light.

Third Embodiment

FIG. 20 is a plan view illustrating an area light source device 81 according to a third embodiment of the present invention. FIG. 21 is a partially enlarged perspective view illustrating the light introduction part 35 of the area light source device 81.

In the area light source device 81 of the third embodiment, a light diffusion pattern 82 that horizontally spreads the light is provided in a region facing at least the light source 32 in the light incident surface 38 of the light introduction part 35. As illustrated in FIG. 21, the light diffusion pattern 82 may be formed into a cylindrical lens shape in which the convex lenses extending in the height direction are horizontally arrayed. Alternatively, the light diffusion pattern 82 may be constructed by arraying the V-grooves extending in the height direction in parallel with one another, or the light diffusion pattern 82 may be a pattern having a random shape.

In the area light source device 81 having the above structure, the light is sent to the side surface direction of the light guide plate 33 while horizontally spread by the light diffusion pattern 82, thereby preventing darkening of the side edge portion of the light exit surface 39. Additionally, the directional pattern of the light sent to the side surface direction is changed to the direction parallel to the optical axis C by the directivity change pattern 40, whereby the light hardly leaks from the side surface of the light guide plate 33 or the lenticular lens 36.

Fourth Embodiment

FIG. 22 is a perspective view illustrating an area light source device 91 according to a fourth embodiment of the present invention. In the area light source device 91, in front of the light source 32, a projection part 92 is formed in the inclined surface 37 of the light introduction part 35. The projection part 92 has the same shape as part of a truncated cone. In the case that the projection part 92 is provided in the inclined surface 37, the light source 32 is surrounded into a substantial arc by an outer peripheral surface (the inclined surface) of the projection part 92 when the light guide plate 33 is viewed from above. Therefore, the light, which is emitted from the light source 32 and enters the light introduction part 35 through the light incident surface 38, is substantially perpendicularly incident to the outer peripheral surface of the projection part 92. As a result, the light hardly leaks from the inclined surface (the outer peripheral surface of the projection part 92) of the light introduction part 35, and efficiency of the light guide from the light introduction part 35 to the light guide plate body 34 is improved.

(Modification)

In the area light source device of the fourth embodiment, as illustrated in FIG. 23, a light diffusion pattern 93 may be provided in the outer peripheral surface of the projection part 92 in order to horizontally spread the light.

In the case that the light diffusion pattern 72 or 93 is provided on the inclined surface 37 like the area light source devices in FIGS. 17 to 19 and 23, according to one or more embodiments of the present invention, the gap is not generated between the light diffusion pattern 72 or 93 and the directivity change pattern 40. That is, desirably, as illustrated in FIG. 24, the light-introduction-part-side end surface 49 of the directivity change pattern 40 is connected to the light diffusion pattern 72 or 93 on the inclined surface so as to pierce the light diffusion pattern 72 or 93, and the pattern-forming-region-side end surface of the light diffusion pattern 72 or 93 of the inclined surface is also connected to the directivity change pattern 40 in the pattern forming region 47 so as to pierce the directivity change pattern 40.

Fifth Embodiment

FIG. 25 is a perspective view illustrating an area light source device 96 according to a fifth embodiment of the present invention. In the area light source device 96, the plural light sources 32 are used with respect to one light guide plate 33. That is, the plural light sources 32 are disposed at constant intervals while facing the light incident surface 38 of the light guide plate 33. The directivity change pattern 40 corresponding to each light source 32 is formed in the pattern forming region 47. According to the fifth embodiment, the area light source device having the large-area lighting region 46 can be produced. A structure of the light guide plate, which becomes a base of the area light source device 96 may be any one of the light guide plates of the first to fourth embodiments.

Sixth Embodiment

FIG. 26 is a schematic sectional view of a liquid crystal display device 101 in which the area light source device (for example, the area light source device 31 of the first embodiment) is used. In the liquid crystal display device 101, a diffuser plate 102, a prism sheet 103, and a liquid crystal panel 104 are stacked while facing the light exit surface side of the light guide plate 33, and a reflecting sheet 105 is disposed on a rear surface side of the light guide plate 33. The liquid crystal display device 101 can make use of the feature of the area light source device according to one or more embodiments of the present invention, the light use efficiency of the liquid crystal display device 101 can be improved to facilitate visualization of the screen, and the thinner liquid crystal display device 101 can be achieved.

Seventh Embodiment

FIG. 27 is a plan view illustrating a mobile device, namely, a smartphone 111 in which the area light source device or liquid crystal display device according to one or more embodiments of the present invention is used. The smartphone 111 includes a liquid crystal display device 112 provided with a touch panel. When the area light source device according to one or more embodiments of the present invention is used in the smartphone, quality of the display screen is improved because the eyespot luminescence or bright line is hardly generated. In addition to mobile phones, such as the smartphone, the area light source device according to one or more embodiments of the present invention can be applied to mobile devices, such as a tablet computer, an electronic dictionary, and an electronic book reader.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
   an end surface configured to have light incident thereon;
   a light introduction part that confines light incident through the end surface; and
   a light guide plate body disposed to be continuously joined to the light introduction part,
   wherein the light guide plate body has a thickness smaller than a maximum thickness of the light introduction part,
   wherein the light guide plate body outputs the incident light to an outside from a lighting region through a light exit part,
   wherein the light introduction part includes an inclined surface in at least one of a light-exit-side surface and an opposite surface of the light-exit-side surface,
   wherein the inclined surface is inclined toward an end of the light guide plate body from a surface of a portion thicker than the light guide plate body,
   wherein the light guide plate body includes a directivity change pattern in a region located between the light introduction part and the lighting region in at least one of the light-exit-side surface and the opposite surface of the light-exit-side surface,
   wherein the directivity change pattern changes directivity of the light passing to the lighting region from the light introduction part,
   wherein at least part of a local minimum portion of the directivity change pattern is located inside the light guide plate body from a surface of the lighting region,
   wherein at least part of the local maximum portion of the directivity change pattern is located outside the surface of the lighting region,
   wherein in the directivity change pattern, a lighting-region-side end surface of a portion projected outward from the surface of the lighting region has an angle of 45° or less with respect to the surface of the lighting region, and
   wherein a portion located below the surface of the lighting region is inclined upwards toward the lighting region.

2. The light guide plate according to claim 1, wherein the whole local minimum portion of the directivity change pattern is located inside the light guide plate body from the surface of the lighting region.

3. A light guide plate comprising:
an end surface configured to have light incident thereon;
a light introduction part that confines light incident through the end surface; and
a light guide plate body disposed to be continuously joined to the light introduction part,
wherein the light guide plate body has a thickness smaller than a maximum thickness of the light introduction part,
wherein the light guide plate body outputs the incident light to an outside from a lighting region through a light exit part,
wherein the light introduction part includes an inclined surface in at least one of a light-exit-side surface and an opposite surface of the light-exit-side surface,
wherein the inclined surface is inclined toward an end of the light guide plate body from a surface of a portion thicker than the light guide plate body,
wherein the light guide plate body includes a directivity change pattern in a region located between the light introduction part and the lighting region in at least one of the light-exit-side surface and the opposite surface of the light-exit-side surface,
wherein the directivity change pattern changes directivity of the light passing to the lighting region from the light introduction part, and
wherein at least part of a local maximum portion of the directivity change pattern is located inside the light guide plate body from a surface of the lighting region,
wherein at least part of the local maximum portion of the directivity change pattern is located outside the surface of the lighting region,
wherein in the directivity change pattern, a lighting-region-side end surface of a portion projected outward from the surface of the lighting region has an angle of 45° or less with respect to the surface of the lighting region, and
wherein a portion located below the surface of the lighting region is inclined upwards toward the lighting region.

4. The light guide plate according to claim 3, wherein the whole local maximum portion of the directivity change pattern is located inside the light guide plate body from the surface of the lighting region.

5. A light guide plate comprising:
an end surface configured to have a light incident thereon:
a light introduction part that confines light incident through the end surface; and
a light guide plate body disposed to be continuously joined to the light introduction part,
wherein the light guide plate body has a thickness smaller than a maximum thickness of the light introduction part,
wherein the light guide plate body outputs the incident light to an outside from a lighting region through a light exit part,
wherein the light introduction part includes an inclined surface in at least one of a light-exit-side surface and an opposite surface of the light-exit-side surface,
wherein the inclined surface is inclined toward an end of the light guide plate body from a surface of a portion thicker than the light guide plate body,
wherein the light guide plate body includes a directivity change pattern in a region located between the light introduction part and the lighting region in at least one of the light-exit-side surface and the opposite surface of the light-exit-side surface,
wherein the directivity change pattern changes directivity of the light passing to the lighting region from the light introduction part,
wherein at least part of a local minimum portion of the directivity change pattern is located inside the light guide plate body from a surface of the lighting region,
wherein a light-introduction-part-side end portion of the directivity change pattern is connected to the inclined surface of the light introduction part so as to pierce the inclined surface,
wherein at least part of the local maximum portion of the directivity change pattern is located outside the surface of the lighting region,
wherein in the directivity change pattern, a lighting-region-side end surface of a portion projected outward from the surface of the lighting region has an angle of 45° or less with respect to the surface of the lighting region, and
wherein a portion located below the surface of the lighting region is inclined upwards toward the lighting region.

6. The light guide plate according to claim 1, wherein the directivity change pattern changes the directivity of the light passing to the lighting region from the light introduction part such that an angle formed by the light with a direction perpendicular to the end surface of the light introduction part, when viewed from a direction perpendicular to the lighting region, becomes smaller than before passing through the directivity change pattern.

7. The light guide plate according to claim 1, wherein a light diffusion pattern is provided in the light introduction part in order to spread the light incident through the end surface of the light introduction part in a width direction of the light guide plate body.

8. The light guide plate according to claim 1, wherein a lenticular lens shape is formed in the lighting region.

9. An area light source device comprising:
the light guide plate according to claim 1; and
a light source that emits the light to the end surface of the light introduction part in the light guide plate.

10. A liquid crystal display device comprising:
the light guide plate according to claim 1;
a light source that emits the light to the end surface of the light introduction part in the light guide plate; and
a liquid crystal panel that is disposed on the lighting region of the light guide plate.

11. A mobile device comprising the liquid crystal display device according to claim 10.

12. The light guide plate according to claim 2, wherein the directivity change pattern changes the directivity of the light passing to the lighting region from the light introduction part such that an angle formed by the light with a direction perpendicular to the end surface of the light introduction part when viewed from a direction perpendicular to the lighting region becomes smaller than before passing through the directivity change pattern.

13. The light guide plate according to claim 3, wherein the directivity change pattern changes the directivity of the light passing to the lighting region from the light introduction part such that an angle formed by the light with a direction perpendicular to the end surface of the light introduction part when viewed from a direction perpendicular to the lighting region becomes smaller than before passing through the directivity change pattern.

14. The light guide plate according to claim 4, wherein the directivity change pattern changes the directivity of the light passing to the lighting region from the light introduction part such that an angle formed by the light with a direction perpendicular to the end surface of the light introduction part when viewed from a direction perpendicular to the lighting region becomes smaller than before passing through the directivity change pattern.

15. The light guide plate according to claim 5, wherein the directivity change pattern changes the directivity of the light passing to the lighting region from the light introduction part such that an angle formed by the light with a direction perpendicular to the end surface of the light introduction part when viewed from a direction perpendicular to the lighting region becomes smaller than before passing through the directivity change pattern.

16. The light guide plate according to claim 2, wherein a light diffusion pattern is provided in the light introduction part in order to spread the light incident through the end surface of the light introduction part in a width direction of the light guide plate body.

17. The light guide plate according to claim 3, wherein a light diffusion pattern is provided in the light introduction part in order to spread the light incident through the end surface of the light introduction part in a width direction of the light guide plate body.

18. The light guide plate according to claim 1, wherein the directivity change pattern comprises an upper surface that is parallel to the surface of the lighting region, and that abuts the lighting-region-side end surface.

19. The light guide plate according to claim 3, wherein the directivity change pattern comprises an upper surface that is parallel to the surface of the lighting region, and that abuts the lighting-region-side end surface.

* * * * *